United States Patent [19]

Akanabe et al.

[11] Patent Number: 5,214,528
[45] Date of Patent: May 25, 1993

[54] OPTICAL BEAM SCANNING APPARATUS

[75] Inventors: Yuichi Akanabe; Shin Shinotsuka, both of Hino, Japan

[73] Assignee: Konica Corporation, Tokyo, Japan

[21] Appl. No.: 757,347

[22] Filed: Sep. 10, 1991

[30] Foreign Application Priority Data

Sep. 14, 1990 [JP] Japan .................... 2-242778

[51] Int. Cl.$^5$ ............................ G02B 26/08
[52] U.S. Cl. ..................... 359/211; 359/201; 359/188; 359/220; 358/493
[58] Field of Search .......... 359/201, 202, 203, 204, 359/209, 210, 211, 188, 220, 831, 833, 834, 837; 358/491, 493; 250/235, 236

[56] References Cited

U.S. PATENT DOCUMENTS

| | | | |
|---|---|---|---|
| 3,532,037 | 10/1970 | Neuilly et al. | 359/211 |
| 3,651,256 | 3/1972 | Sherman et al. | 359/220 |
| 3,823,276 | 7/1974 | Maslowski et al. | 346/108 |
| 3,924,937 | 12/1975 | Munroe et al. | 359/211 |
| 4,475,787 | 10/1984 | Starkweather | 359/211 |
| 4,550,985 | 11/1985 | Hayashi | 359/209 |
| 4,815,067 | 3/1989 | Webster et al. | 369/97 |
| 4,853,709 | 8/1989 | Stein et al. | 359/220 |
| 4,948,228 | 8/1990 | Keens | 359/831 |
| 4,978,200 | 12/1990 | Dean | 359/831 |
| 5,011,245 | 4/1991 | Gibbs | 359/211 |
| 5,015,064 | 5/1991 | Detig et al. | 359/211 |
| 5,026,133 | 6/1991 | Roddy et al. | 359/210 |

FOREIGN PATENT DOCUMENTS

| | | |
|---|---|---|
| 264341 | 4/1988 | European Pat. Off. . |
| 0307095 | 3/1989 | European Pat. Off. . |
| 373263 | 6/1990 | European Pat. Off. . |
| 3126642 | 6/1982 | Fed. Rep. of Germany . |
| 0735197 | 11/1932 | France .................... 359/220 |
| 63-158580 | 7/1987 | Japan . |

OTHER PUBLICATIONS

Patent Abstracts of Japan, vol. 13424; Sep. 21, 1989 JP-1-155371; Jun. 19, 1989.

*Primary Examiner*—Loha Ben
*Attorney, Agent, or Firm*—Jordan B. Bierman

[57] ABSTRACT

Disclosed are optical beam scanning apparatus and method of the internal drum scanning system, in which optical beams from a light source are made incident on optical beam rotating means such as a trapezoidal prism, and outgoing beams are focussed on the inner face of a cylinder through rotary optical means such as a rotary reflecting element. In the scanning apparatus and method of the present invention, by rotating the trapezoidal prism on the same revolution axis as that of the rotary reflecting element at a revolution speed corresponding to ½ of the revolution speed of the rotary reflecting element, beams going out from the trapezoidal prism can be rotated at the same speed as the revolution speed of the rotary reflecting element. According to the present invention having the above structure, even when a plurality of beams are used, crossing of the beams on the inner face of the cylinder can be prevented, and multiple beam scanning becomes possible and recording can be performed at a high speed.

24 Claims, 17 Drawing Sheets

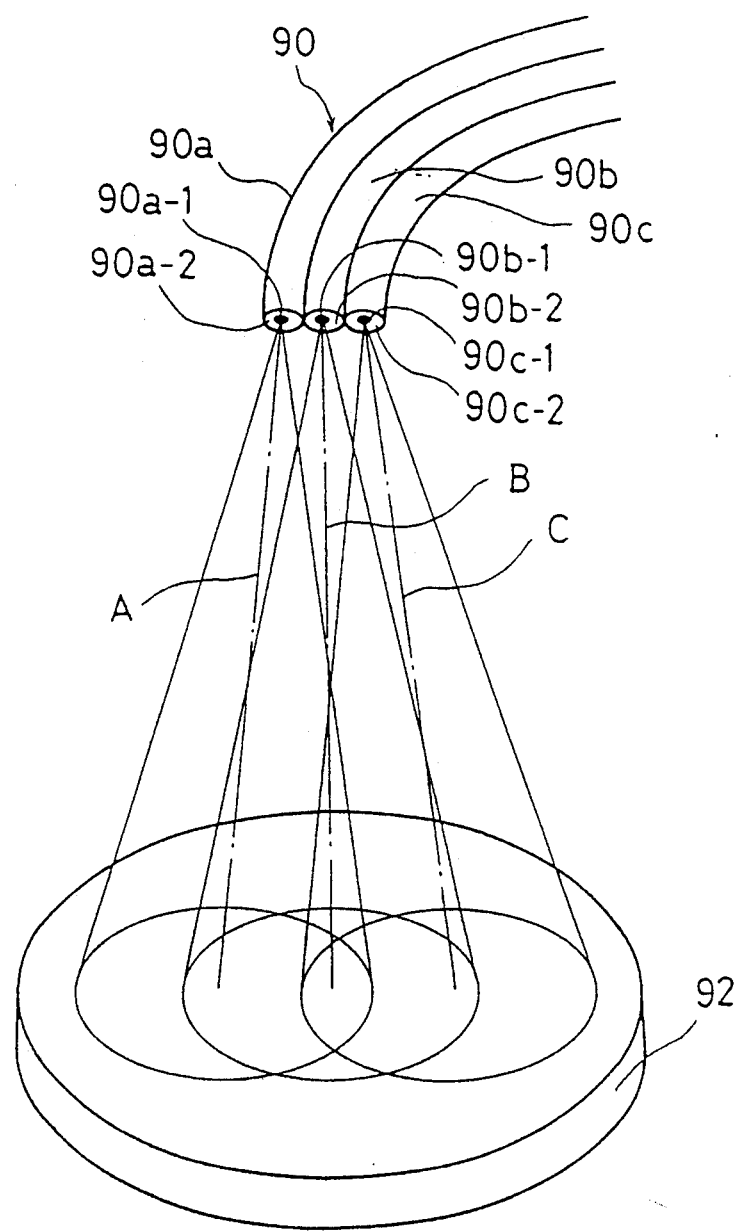

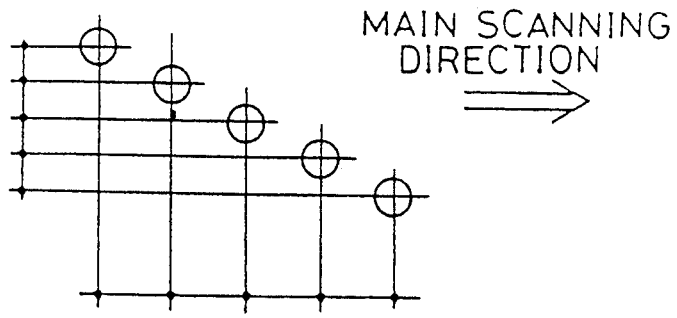
Fig.19(a)    MAIN SCANNING DIRECTION →
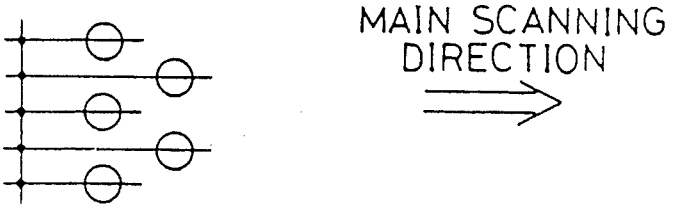
Fig.19(b)    MAIN SCANNING DIRECTION →
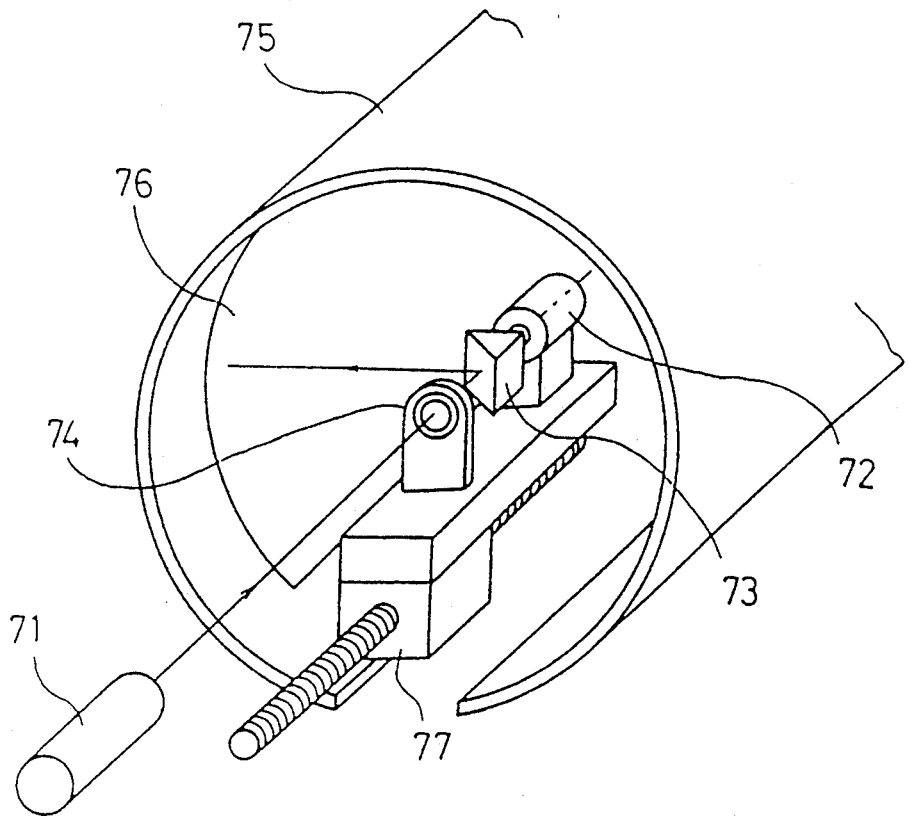
Fig.22 (PRIOR ART)

OPTICAL BEAM SCANNING APPARATUS

BACKGROUND OF THE INVENTION

(1) Field of the Invention

The present invention relates to an optical beam scanning apparatus in the field of the technique of recording images by scanning optical beams such as laser beams. More particularly, the present invention relates to an optical beam scanning apparatus and method of the type effective for a system where a broad scanning width and a small focussed beam diameter are required, such as an output equipment of a printing plate-making machine or a film printer for forming an original plate for printed substrates.

(2) Description of the Related Art

Optical beam scanning apparatuses of this type adopted at the present are roughly divided into the following three classes, and they have merits and demerits.

According to the most developed so-called drum scanner system, a photosensitive material is wound around a rotary drum, main scanning is performed by rotating the drum by a motor, and subsidiary scanning is effected by moving an optical source unit in a direction substantially perpendicular to the direction of main scanning by a subsidiary scanning mechanism, whereby an image is recorded.

According to this system, sufficiently good performances can be obtained with respect to the recording size and the image quality. However, since main scanning is accomplished by rotating a large drum having a photosensitive material attached thereto, the revolution speed is restricted by a large moment of inertia of the drum, and hence, the recording speed also is restricted.

In order to eliminate this disadvantage, there is often adopted in combination a so-called multiple beam recording system in which a plurality of optical fibers are arranged in parallel to construct an optical source unit, means for focussing optical beams going out from the end faces of the optical fibers to the photosensitive material is used, and thus, a plurality of main scannings are performed by one revolution by using a plurality of optical beams. However, even if such means is adopted, it is difficult to obtain a recording speed higher than recording speeds attainable in the two systems, described below, where optical beams per se are scanned, and no rapid improvement in the future can be expected.

The flat field scanning system will now be described. According to this system, optical beams going out from a light source is moved in the direction of main scanning by a rotary polygonal mirror rotated by a motor and are focussed by a lens to effect main scanning of optical beams on a photosensitive material. The photosensitive material is moved in a direction substantially perpendicular to the direction of main scanning to effect subsidiary scanning. Thus, an image is recorded.

According to this system, main scanning is performed by moving optical beams per se by using a so-called rotary polygonal mirror or rotary pyramidal mirror. Therefore, the moment of inertia of the rotary member can be reduced, and hence, the revolution speed can be increased relatively easily. Furthermore, a plurality of main scannings corresponding to the number of planes of the mirror can be conducted by one revolution, and therefore, a high recording speed can be obtained relatively easily.

However, in the case where a broad scanning width is required as pointed out above, because of limitations in the design and production of lenses, it is difficult to obtain a small focussed beam diameter and it also is difficult to maintain a constant beam diameter and a constant beam shape through the entire scanning width. Moreover, unevenness of scanning line intervals, one defect of this system, is required to decrease as the beam diameter is reduced, and it is difficult to control this unevenness of scanning line intervals to the required level.

For these reasons, according to the flat field scanning system, a sufficient recording speed can be easily obtained, but it is difficult to simultaneously attain a satisfactory recording size and a satisfactory image quality.

Moreover in the flat field scanning system, the focal distance of the lens is generally equal to or larger than the scanning width because of the limitation of design of the lens, and the size of the scanning optical system becomes relatively large.

The other system of rotating optical beams per se is a system in which a stationary drum (hereinafter referred to as "cylinder") is used, and optical beams are rotated and scanned in the interior of the cylinder to a photosensitive material attached to the surface of the cylinder to effect recording of images (Japanese Unexamined Patent Publication No. 63-158580).

According to this system, optical beams from a light source are reflected by a light-reflecting element rotated in the interior of a cylinder by a motor, and by the focussing action of a lens arranged in an optical path, main scanning of the focussed optical beams is performed in the circumferential direction on the photosensitive material attached to the surface of the cylinder, while subsidiary scanning is performed in the axial direction by a subsidiary scanning mechanism, whereby an image is recorded.

For attaching the photosensitive material to the surface of the cylinder the photosensitive material can be retained on the inner surface of the cylinder, or the photosensitive material can be retained on the outer surface of a cylinder composed of a transparent material. The former method will be explained in the following description. This method will be called "internal drum scanning system". The light-reflecting element used in this system will be called "rotary reflecting element" in the following description.

According to this system, optical beams coming substantially in parallel to the revolution axis are reflected substantially in the perpendicular direction by the rotary reflecting element rotating with the central axis of the cylinder being as the revolution axis, whereby the photosensitive material attached to the inner surface of the cylinder is scanned and light-exposed.

The reflecting direction need not absolutely be the perpendicular direction, but a direction different from the rectangular direction can be adopted as the reflecting direction, so far as any bad influences are practically brought about by increase of the distance between the reflecting point and the point of light exposure of the photosensitive material or increase of the magnitude of the optical beams on the surface of the cylinder in the axial direction of the cylinder, caused by adopting the reflecting direction different from the perpendicular direction.

This system is characterized in that a relatively large scanning width is obtainable with a condenser lens having a short focal distance, as compared with the above-mentioned flat field scanning system. The fact that a lens having a short focal distance results in an advantage that a small focussed beam diameter required for high image quality recording can be easily obtained.

Furthermore, the problem of unevenness of scanning line intervals, which is serious in the flat field scanning system, can be moderated by the short focal distance of the lens.

The effective diameter of the condenser lens may be almost equal to the incident beam diameter, and a large lens as used in the flat field scanning mechanism need not be used so as to cope with a broad incident angle.

It is easy to maintain a constant beam diameter and a constant beam shape on the surface of the cylinder almost along the entire periphery thereof by increasing the mating precision between the revolution axis of the rotary reflecting element and the central axis of the cylinder according to need.

In short, according to the internal drum scanning system, the image quality can be improved more easily than in the flat field scanning system.

Even in view of limitations owing to mechanical arrangements of inlet and outlet openings of the photosensitive material, a holding mechanism for the rotary reflecting element, the subsidiary scanning mechanism and the like, it is sufficient if a scanning width corresponding to about 70 to about 80% of the entire circumferential length of the cylinder can be obtained and the focal distance of the condenser lens is slightly longer than the radius of the cylinder, and therefore, a scanning width about three times the focal distance of the lens can be easily obtained.

As the rotary reflecting element, a rectangular prism or pentagonal prism can be used instead of the mirror.

The lens can be rotated integrally with the rotary reflecting element in an optical path formed between the rotary reflecting element and the photosensitive material. In this case, the moment of inertia of the rotary members disadvantageously increases, but the focal distance of the lens can be made shorter than the radius of the cylinder and a smaller focussed beam diameter can be easily obtained. Namely, there can be attained an advantage that the diameter of beams incident in the lens, required for obtaining a constant focussed beam diameter, can be reduced.

In short, the internal drum scanning system is advantageous over the drum scanner system in that since the moment of inertia of the rotary members is small, the revolution speed can be easily increased and also the recording speed can be easily increased.

The internal drum scanning system is advantageous over the flat field scanning system in that the recording size can be easily made compatible with the image quality and the size of the apparatus can be easily reduced.

The internal drum scanning system has these merits, but this system is defective in that the recording speed cannot be increased so easily as in the flat field scanning system.

The reasons are as follows.

The first reason is that use of multiple beams (multi-beams) is difficult. The second reason is that it is difficult to perform a plurality of scannings of optical beams by one revolution using a rotary polygonal mirror or a rotary pyramidal mirror.

The reason why use of multiple beams is difficult is that in the case where a plurality of beams are reflected by the rotary reflecting element and scanned on the inner surface of the cylinder, the beams cross one another at two points on the inner surface of the cylinder and parallel dot rows necessary for recording of images are not formed.

In case of the flat field scanning system, a plurality of scannings can be performed by one revolution by using a known rotary polygonal mirror. However, in case of the internal drum scanning system, since the advantage of this system that a large scanning width can be obtained by a relatively small structure by performing scanning over an angle as broad as possible within the entire circumferential angle of 360 degrees should be effectively utilized, it is difficult to effect a plurality of scannings by one revolution by using a so-called rotary polygonal mirror or rotary pyramidal mirror.

When a rotary polygonal mirror or rotary pyramidal mirror is used in the internal drum scanning, the center of revolution is located a little bit distant from the central axis of the cylinder or the optical beams, and from the geometrical consideration, it is understood that the reflecting point is displaced in the plane rectangular to the central axis of the cylinder in the former case or toward the direction of the central axis of the cylinder in the latter case. Also for this reason, a rotary polygonal mirror or rotary pyramidal mirror can hardly be used.

Accordingly, in order to increase the recording speed by a single beam, it is necessary to rotate the rotary reflecting element at a very high speed.

For the foregoing reasons, in the internal drum scanning system, it is very difficult to attain a recording speed as high as attainable in the flat field scanning system.

As the means for solving this problem, there can be mentioned a method, as disclosed in Japanese Unexamined Patent Publication No. 59-119960 or Japanese Unexamined Patent Publication No. 57-151933, in which a plurality of light sources, optionally together with a driving current source, are mounted on a rotary member arranged within a cylinder and the light sources are rotated with the central axis of the cylinder being as the center to realize scanning of multiple beams.

According to this method, however, it is necessary to mount a plurality of light sources, electronic circuits for modulating the light sources, a generator for supplying electricity to the electronic circuits, power source-stabilizing circuits, and the like on the rotary member, and the moment of inertia of these members including a mechanism for holding these members stably on the rotary member becomes large, and therefore, the attainable revolution speed is limited.

SUMMERY OF THE INVENTION

Under this background, a primary object of the present invention is to provide an optical beam scanning apparatus and method according to the internal drum scanning system, in which multiple beam scanning is made possible and high-speed recording becomes possible.

Another object of the present invention is to provide an optical beam scanning apparatus in which by providing specific structural means and members constituting the optical beam scanning apparatus, the recording speed can be further increased, and also the image quality and the scanning width are improved.

More specifically, in accordance with the present invention, there is provided an optical beam scanning apparatus, which comprises rotary optical means rotating on the revolution axis to introduce optical beams incident substantially in parallel to the revolution axis into a direction substantially perpendicular to the revolution axis, wherein the optical beams are rotated and scanned in the interior of a cylinder to a photosensitive material attached to the surface of the cylinder.

More specifically the rotary optical means can comprise a rotary reflecting element reflecting the optical beams incident to the revolution axis at a predetermined angle.

Alternatively, the rotary optical means can comprise a member rotating on the revolution axis and a bundle of optical fibers held on the member, in which one end face of the fiber bundle is arranged in the vicinity of the revolution axis substantially rectangularly to the revolution axis and the other end face is arranged substantially rectangularly to the direction of the radius of revolution.

The optical beam rotating means comprises at least one optical structural member, which is constructed so that the structural member rotates with a line substantially coinciding with the revolution axis being as the revolution axis of the structural member, when optical beams are incident in parallel to the revolution axis, the optical beams going out from the structural member are substantially in parallel to the optical beams incident to the structural member, and that in an optical path between the incident point and outgoing point, the optical beams undergo reflection an odd number of times.

As the optical structural member, there can be used a member comprising a refraction surface refracting the optical beams and an odd number of reflecting surfaces, a member comprising an odd number and at least 3 of reflecting surfaces, a member comprising an element diffracting the optical beams and a reflecting surface reflecting the optical beams, and a trapezoidal prism.

In the above-mentioned structure, by the function of the optical structural member as the optical beam rotating means, a plurality of beams incident to the rotary optical means can be rotated at the same revolution speed as that of the rotary optical means with a revolution axis substantially coinciding with the revolution axis of the rotary optical means, and therefore, a plurality of beams going out from the rotary optical means do not cross one another and substantially parallel beam rows can be formed on the surface of the cylinder in the internal drum scanning, whereby multiple beam scanning becomes possible and recording can be performed at a high speed.

Hereupon, if the revolution phase relation between the beam rotating means and the rotary optical means (rotary reflecting element) is made variable, it is possible to variably set intervals of a plurality of optical beams in the direction perpendicular to the main scanning direction.

Preferably, by changing angles of a plurality of optical beam rows, intervals of the optical beams in the direction perpendicular to the main scanning direction are made variable.

In the case where an optical fiber bundle is used as the rotary optical means, preferably, by variably setting the angle along which end faces of respective fibers on the outgoing side of the optical fiber bundle are aligned, intervals of optical beams in the direction perpendicular to the main scanning are made variable.

A plurality of optical beams differing in the wavelength can be used. In this case, multiple color recording can be performed.

The characteristic features of the present invention and the functions and effects by these features will become apparent from embodiments described hereinafter.

BRIEF DESCRIPTION OF THE DRAWINGS

FIG. 18 is an enlarged view showing the end face on the incident side of the optical fiber bundle.

FIGS. 19(a) and 19(b) are diagrams illustrating an example of the arrangement of the end face on the incident side of the optical fiber bundle.

FIG. 22 is a diagram illustrating the outline of the conventional optical beam scanning apparatus of the internal drum scanning system.

DETAILED DESCRIPTION OF THE PREFERRED EMBODIMENTS

Figure 1:
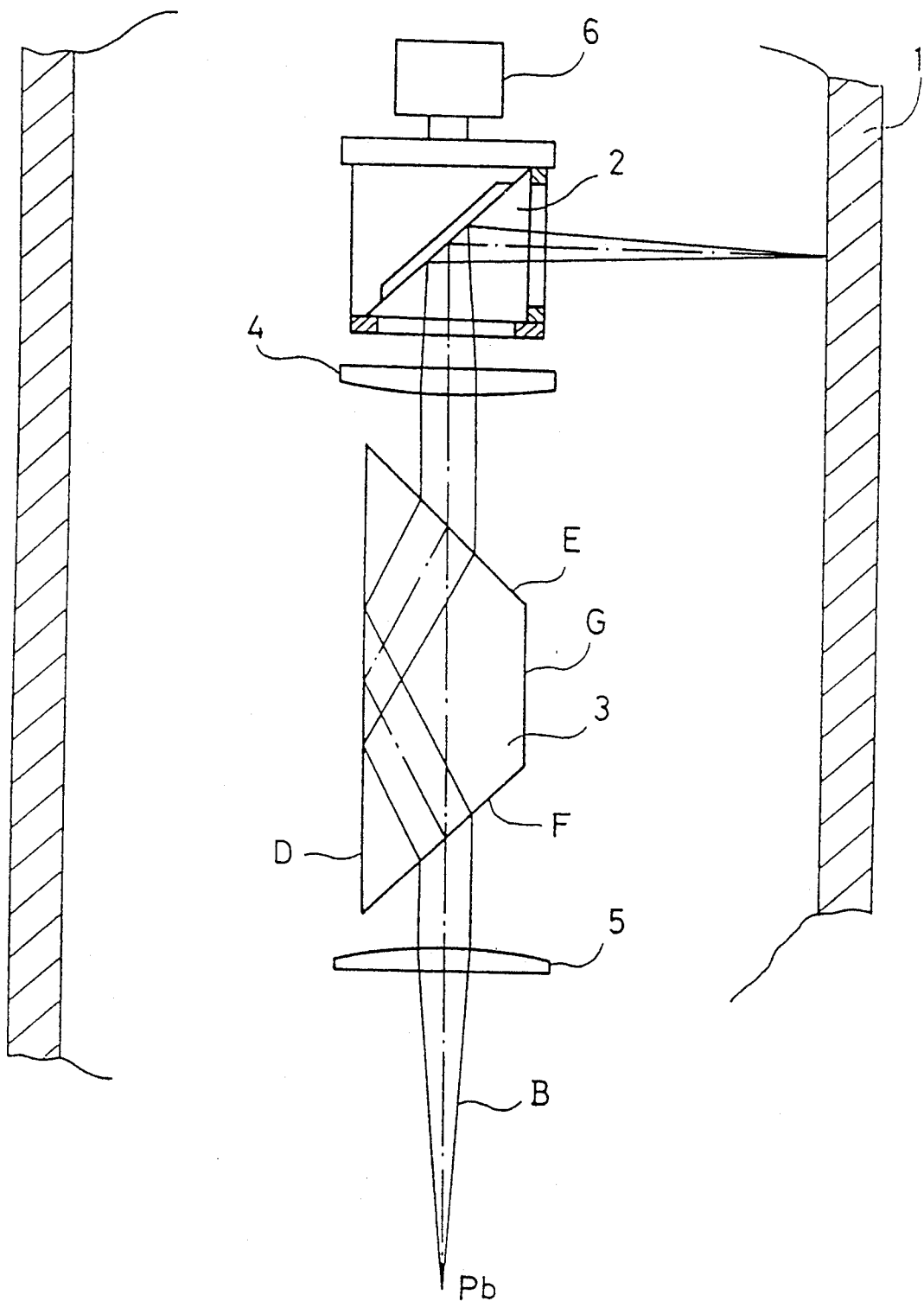
FIG. 1 is a diagram illustrating the outline of an optical beam scanning apparatus of the internal drum scanning system according to one embodiment of the present invention.

Embodiments of the present invention will now be described in detail. At first, the outline of the conventional internal drum scanning system and the state of crossing of a plurality of beams observed when multiple beams are used in this conventional system are described with reference to the accompanying drawings.

The outline of the conventional internal drum scanning system is shown in FIG. 22.

Optical beams from a light source 71 are reflected by a rotary reflecting element 73 rotated by a motor 72, and the optical beams are focussed on a photosensitive material 76 attached to the inner surface of a cylinder by a condensing action of a lens 74 arranged in an optical path. Thus, main scanning of the focussed optical beams is performed, while subsidiary scanning is effected by a subsidiary scanning mechanism 77, whereby an image is recorded.

More specifically, by the rotary reflecting element 73 rotating with the center axis of the cylinder 75 being as the revolution axis, the optical beams incident substantially in parallel to the revolution axis are reflected substantially perpendicularly, and the optical beams are scanned on the photosensitive material 76 attached to the inner surface of the cylinder 75 to effect light exposure of the photosensitive material 76.

In the case where multiple beams are used in the conventional internal drum scanning system, a plurality of beams cross one another. This state will be explained with reference to FIGS. 23 through 28.

In the drawings and the following description, for simplification of the illustration, each beam is shown as a geometrical optical ray, and also this ray is called "beam". For example, also the optical ray indicating beams A is called "beam A". Although the practical beam has a definite divergence, but is condensed on one point near the inner surface of the cylinder within the range of the divergence determined by the aberration and diffraction. Accordingly, the beam is explained with reference to an appropriate optical ray within the beam.

Figure 23:
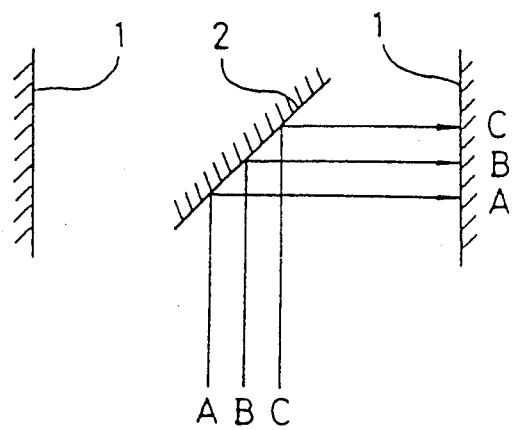
FIG. 23 is a diagram of parallel beams, which shows the problem of the conventional technique.

Referring to FIG. 23, three beams A, B and C parallel to one another are incident on the reflecting surface of the rotary reflecting element 2 and are projected to the inner surface of the cylinder 1.

For the purpose of multiple beam recording, practical intervals of the beams A, B and C are very small, but for facilitating the understanding, the intervals are broadened in the drawings.

The beam B is a beam coinciding with the revolution axis of the rotary reflecting element 2.

Figure 24:
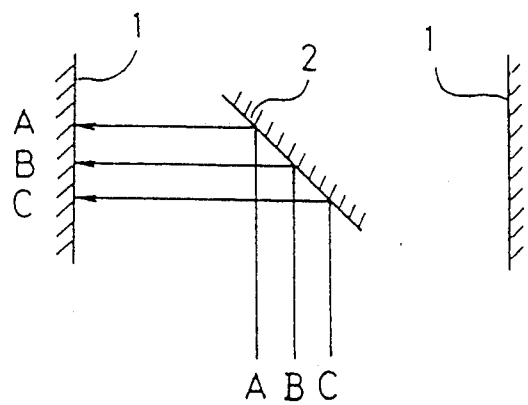
FIG. 24 is a diagram showing the state where the reflecting rotary element is rotated by 180 degrees from the position shown in FIG. 23.

When the rotary reflecting element 2 is rotated by 180 degrees and arrives at the position shown in FIG. 24, the beams A and C are reversed upside down.

Thus, it is understood that the beams A and C cross each other between the positions shown in FIGS. 23 and 24 on the inner surface of the cylinder.

Figure 25:
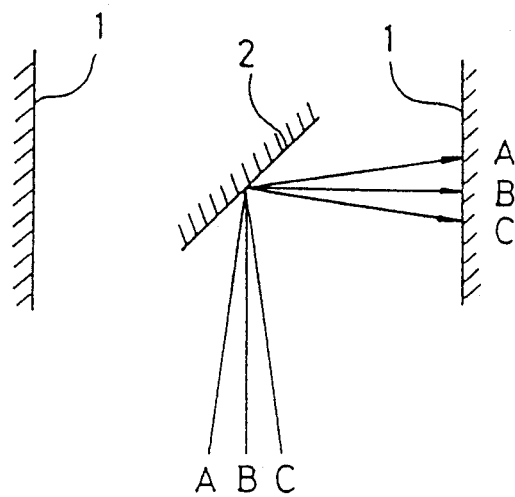
FIG. 25 is a diagram of inclined beams, which shows the problem of the conventional technique.
Figure 26:
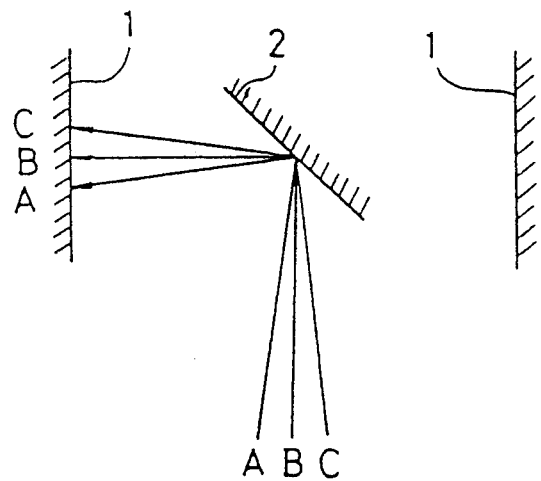
FIG. 26 is a diagram showing the state where the reflecting rotary element is rotated by 180 degrees from the position shown in FIG. 25.

Furthermore, even if, as shown in FIG. 25, the beams A and C are made incident in the state tilting by a small angle so that the beams A and C become coincident with the beam B on the reflecting surface of the rotary reflecting element 2, when the rotary reflecting element 2 is rotated by 180 degrees, as shown in FIG. 26, from the geometrical consideration, it is understood that the beams A and C are similarly reversed upside down.

Also in this case, for the purpose of multiple beam scanning, the inclination angle of each beam is very small, but for facilitating the understanding, the angle is shown considerably large in the drawings.

Figure 27:
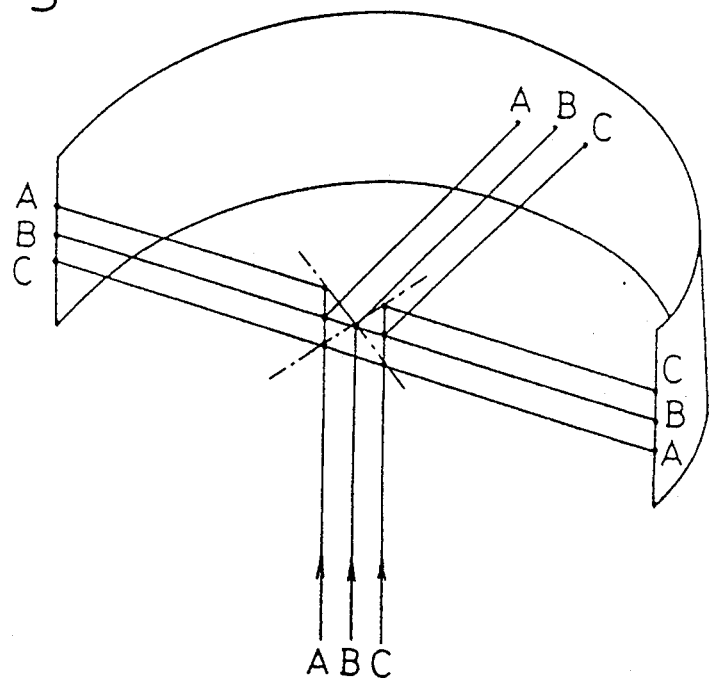
FIG. 27 is a perspective view showing the state where beams cross one another in the conventional technique.
Figure 28:
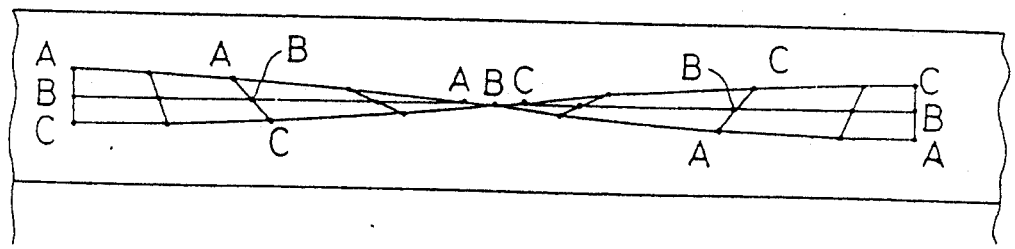
FIG. 28 is an elevation of FIG. 27.

The state where the beams A, B and C cross one another along the half circle on the inner surface of the cylinder is shown in a perspective view of FIG. 27 and a development of FIG. 28.

In the case where recording is effected within part of the cylinder, not over the entire circumference of the cylinder, even if the beams A and C do not cross, curving is caused as is apparent from the foregoing description, and the system is not suitable for multiple beam scanning for recording of images.

Incidentally, even though the beams A, B and C can be incident on the rotary reflecting element while making the beams A, B and C coinciding with one another with respect to the incident position and the incident angle. However, even on the inner surface of the cylinder, the beams overlap one another, and therefore, the purpose of multiple beam recording, that is, the purpose of increasing the recording speed by simultaneously scanning a plurality of beams cannot be attained.

Embodiments of the present invention will now be described with reference to the accompanying drawings.

Figure 2:
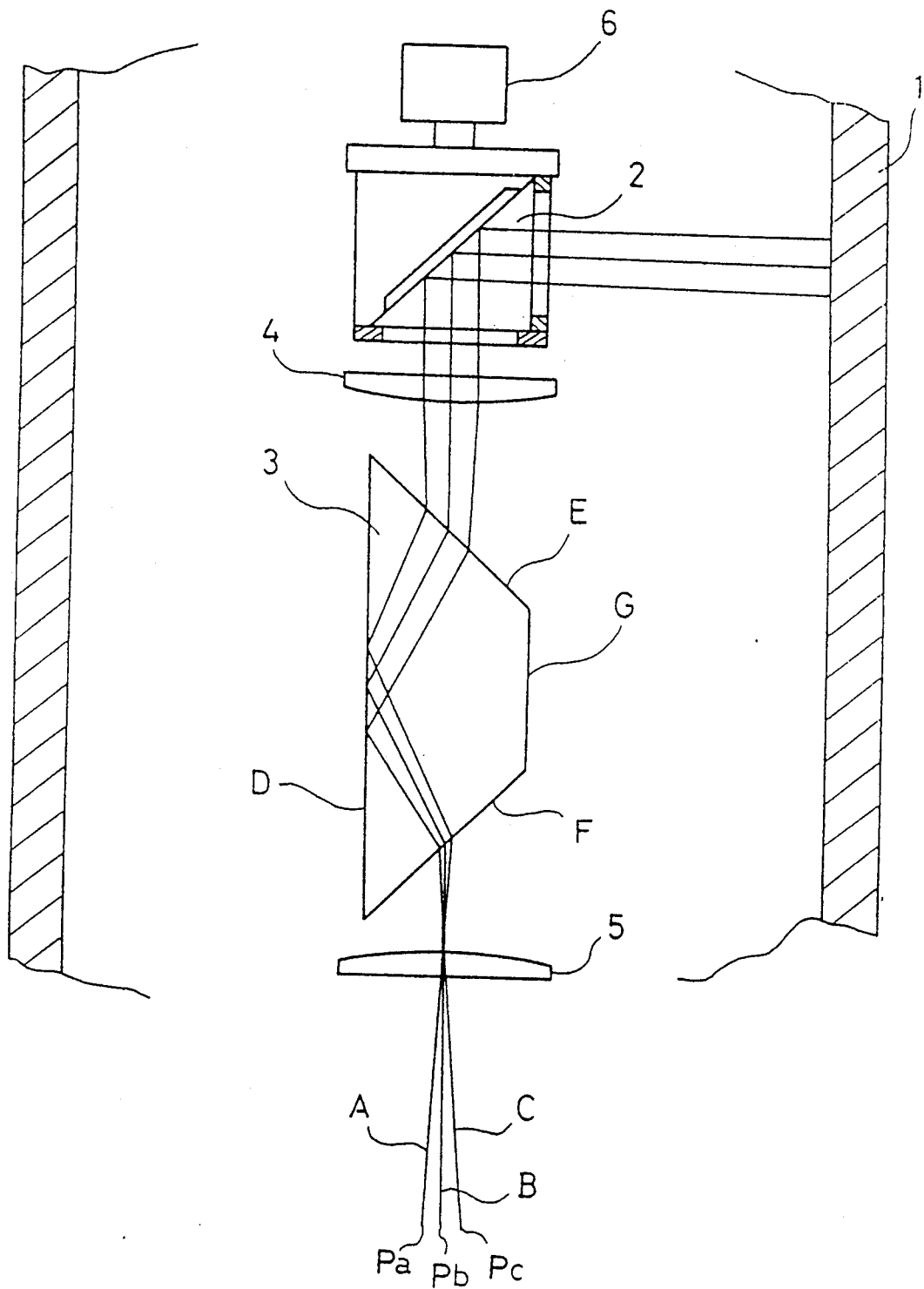
FIG. 2 is a diagram illustrating the embodiment of FIG. 1 where a plurality of beams are scanned.

FIGS. 1 and 2 are diagrams illustrating one embodiment of the present invention. FIG. 1 shows the state where a single beam B is incident. In FIG. 1, a definite divergence of the beam is illustrated.

Reference numeral 1 represents a cylinder to which a photosensitive material is attached, and the photosensitive material, not shown in the drawings, is held on the inner surface of the cylinder.

Reference numeral 2 represents a rotary reflecting element as the rotary optical means, and the rotary reflecting element 2 is rotated with a line substantially coinciding with the central axis of the cylinder 1 being as the revolution axis. In this embodiment, a rectangular prism is used as the rotary reflecting element 2.

Reference numeral 3 represents a trapezoidal prism, which is held by holding means not shown in the drawings. In this embodiment, the trapezoidal prism 3 is rotated at a revolution speed corresponding to $\frac{1}{2}$ of the revolution speed of the rotary reflecting element 2 in the same direction as that of the rotary reflecting element 2 by rotating driving means or revolution-transmitting means not shown in the drawings around a revolution axis substantially coinciding with the above-mentioned revolution axis. The trapezoidal prism 3 constitutes an optical structural member of the optical beam rotating means.

Reference numerals 4 and 5 represent lenses. In the present embodiment, a beam B emitted from point Pb with a certain divergence is made incident as substantially parallel beams on the trapezoidal prism 3 by the lens 5 and the beams going out from the trapezoidal prism 3 are focussed in the vicinity of the inner surface of the cylinder 1 through the rotary reflecting member 2 by the lens 4.

The beam B is a line parallel to the plane D of the trapezoidal prism 3 and parallel to or included in a plane rectangular to planes E and F and the beam B is incident at such a position that if the trapezoidal prism is not present and the beam goes straight, the extension of the above-mentioned line coincides with the outgoing beam. This position can be set by appropriately adjusting the length of the trapezoidal prism 3 in the direction of the revolution axis.

The divergence of the beam B is set so that the divergence is included within an effective incident region of each of the optical elements 2, 3, 4 and 5.

FIG. 2 shows the case where beams A and C are present in close proximity to the beam B.

In FIG. 2, the beam is shown as a light ray, but practically, like the beam B shown in FIG. 1, the beams A and C are emitted from points Pa and Pc with a definite divergence, are made substantially parallel to each other by the lens 5, are passed through the trapezoidal prism 3 and are focussed in the vicinity of the inner surface of the cylinder 1 through the lens 4 and rotary reflecting element 2.

The function of the trapezoidal prism 3 of the present invention will now be described with reference to FIG. 3.

The trapezoidal prism is also called "dove prism", and is a prism of a square pillar having a trapezoidal bottom where confronting two sides, other than parallel sides, have an equal angle to the other sides.

Namely, the side faces E and F of the square pillar form the same angle $\theta$ to the side face D, and the side faces D, E and F are perpendicular to the bottom face. Also the side face G is generally perpendicular to the bottom face and is parallel to the side face D because the bottom face has a trapezoidal shape. In the present invention, since the side face D is not used as the reflecting surface or the like, the side face need not have a specific angle. The same holds good also with respect to the bottom face of the square pillar, but in order to obtain a sufficient processing precision in the face for which a predetermined angle precision is required or to maintain a certain precision in holding the prism, in general, the prism is processed in the form of a trapezoidal square pillar where the side faces and the bottom face are perpendicular.

Furthermore, the intended functional effect of the present invention can be attained even if the side face G is not present, that is, the prism is of a square pillar having an isosceles triangular bottom face.

The case where the beam A is incident on the trapezoidal prism 3 as shown in the drawings will now be considered for examining the state of the beam going out from the trapezoidal prism 3. The incident angle of the beam A is not limited to an angle of a specific direction but the beam A may be inclined in an optional direction to the beam B. However, for attaining the objects of the present invention, the interval between points Pa and Pb in FIG. 2 is small and hence, the inclination angle is small.

The beam A is incident on the face E at point P is reflected on the face D at point Q and goes out from point R on the face F.

The beams A and B going out from the trapezoidal prism 3 are designated as beams A0 and B0, respectively, as shown in the drawings. As pointed out hereinbefore, the beam B0 is coincident with the extension of the beam B before the incidence. The face H is a plane including the beams B and B0 and being in parallel to the face D. Supposing that the trapezoidal prism 3 is not disposed, and imaginary beam line along which the beam A is to advance is designated as beam A2, and an imaginary crossing point between the beam A2 and the face F is designated as R2.

Figure 3:
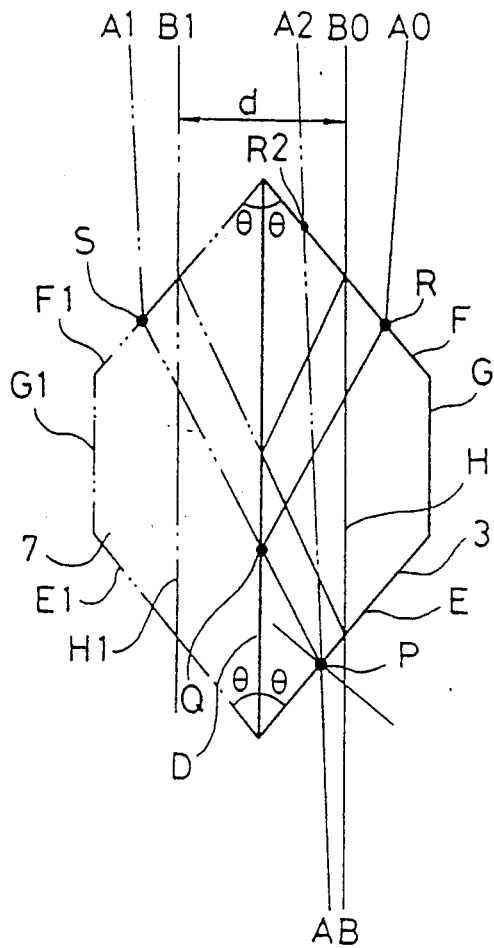
FIG. 3 is a diagram illustrating the function of a trapezoidal prism.

Now, the case where a trapezoidal prism 7 of the same shape is arranged mirror-surface-symmetrically with the trapezoidal prism 3 with respect to the face D and the prisms are integrated with each other as shown in FIG. 3 is now taken into supposition. This imaginary trapezoidal prism 7 has faces represented by the symbols shown in the drawings.

In this supposition beam B1 is a beam obtained when the beam B passes through the face D and goes out from the face F1.

In this supposition, according to the theories of geometrical optics and geometry, the beam B1 is parallel to the beam B0 and is mirror-surface-symmetrical with the beam B0 with respect to the face D. The distance between both the beams is designated as d in the drawings. The face H1 is a plane including the beam B1 and being parallel to the face D.

In the above supposition, the beam obtained when the beam A passing through the face D and going out from the face F1 is made to go out from the face F1 at point S is designated as beam A1.

According to the theories of geometric optics and geometry, it is understood that the beam A1 is mirror-surface-symmetric with the beam A0 with respect to the face D.

Since the face E is parallel to the face F1, according to the theories of geometrical optics and geometry, the beam A1 is parallel to the beam A before incidence and they are parallel to the beam A2.

The positional relation between the beams A1 and B1 and the positional relation between the beams A2 and B0 will now be described. The former relation corresponds to the case where the beams A and B pass through a parallel plane plate constructed by the faces F1 and F2 and the latter relation corresponds to the case where the beams A and B go straight. According to the theory of geometrical optics, when beams not parallel to each other are passed through the parallel plane plate, an aberration is brought about. the positional relation of the beam A1 to the beam B1 is different from the positional relation of the beam A2 to the beam B0 by a portion corresponding to the aberration generated by the above passage through the parallel plane plate, but as pointed out hereinbefore, the inclinations of the beams A and B are very small, and the above positional relations are substantially the same within the range of the above-mentioned aberration.

Accordingly, if the face H1, beam B1 and beam A1 are moved in parallel by distance d and the face H1 and the beam B1 are caused to overlap the face H and the beam B0, respectively, the beam A1 substantially overlaps the beam A2. By this parallel movement, the beam A1 and beam A0 which have been mirror-surface-symmetric with each other with respect to the face D are made mirror-surface-symmetric with each other with respect to the face H.

From the foregoing consideration, it is understood that the beam A0 is substantially mirror-surface-symmetric with the beam A2 with respect to the face H.

Figure 4:
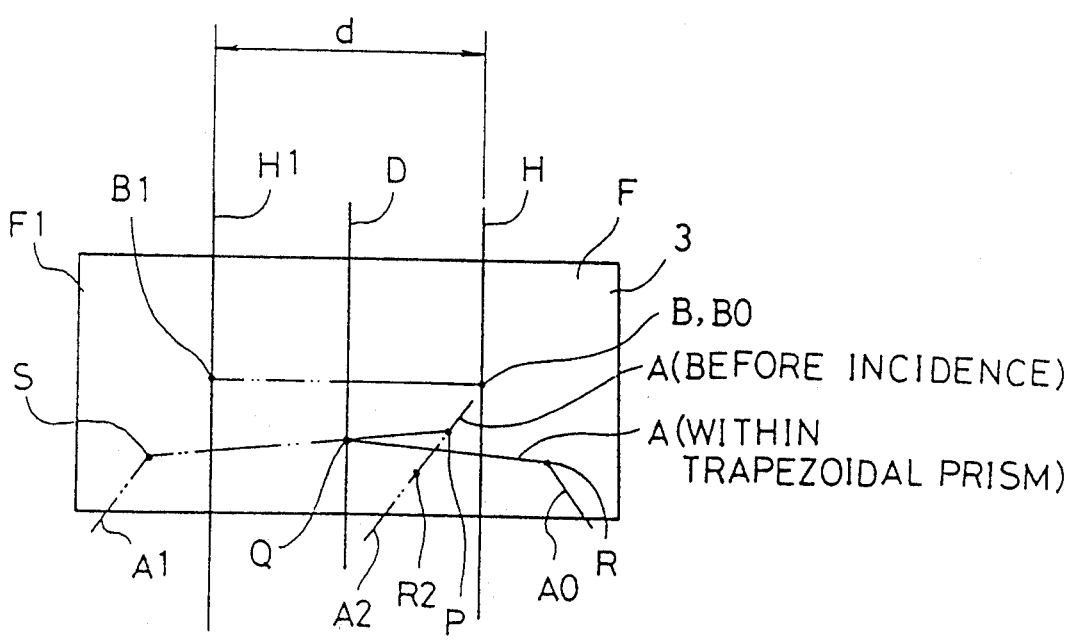
FIG. 4 is a view of FIG. 3 seen from the outgoing side of the optical beams.

This state seen from the out going side of the beams in FIG. 3 is illustrated in FIG. 4.

From the geometrical consideration and the geometrical-optical consideration, it is understood that if the trapezoidal prism 3 is rotated with the line of the beam B0 being as the revolution axis, the outgoing beam A0 is rotated around said revolution axis being as the center at a speed 2 times the revolution speed of the trapezoidal prism 3.

Therefore, if the revolution speed of the trapezoidal prism 3 is adjusted to ½ of the revolution speed of the rotary reflecting element 2 and both the revolution axes are coincident with each other, the beam incident on the rotary reflecting element 2 is rotated at the same speed as that of the rotary reflecting element 2 with the revolution axis of the rotary reflecting element 2 being as the center.

The positional relation between the reflecting surface of the rotary reflecting element and the beam incident thereon is kept substantially constant during the rotation, and a phenomenon of crossing of beams on the inner surface of the cylinder, as mentioned above, is not caused.

It is apparent from the following that the beams do not cross one another. The relative movement of the beams and the cylinder in the state where a constant positional relation is maintained between the rotary reflecting element and a plurality of beams is the same as the relative movement in the state where the cylinder is rotated and the rotary reflecting element stops. Accordingly, it is clear that the beams do not cross one another if the sate where the surface of the cylinder is irradiated with beams in the latter state is taken into consideration.

In the embodiment shown in FIG. 2, three beams are illustrated, but in view of the principle of the present invention, it is clear that the number of beams is not limited to 3 in the present invention but other number of beams can be applied.

A plurality of optical beams need not be placed on the plane including the center line of the beam B outside the trapezoidal prism 3, that is, the line coinciding with the revolution axis of the trapezoidal prism 3, but if the revolution axis of the trapezoidal prism 3 is coincident with the revolution axis of the rotary reflecting element 2, the beam going out from the face F of the trapezoidal prism 3 rotates in follow-up with the rotary reflecting element 2, and the beam is incident on the reflecting face at the same position with the same incidence angle.

Figure 5:
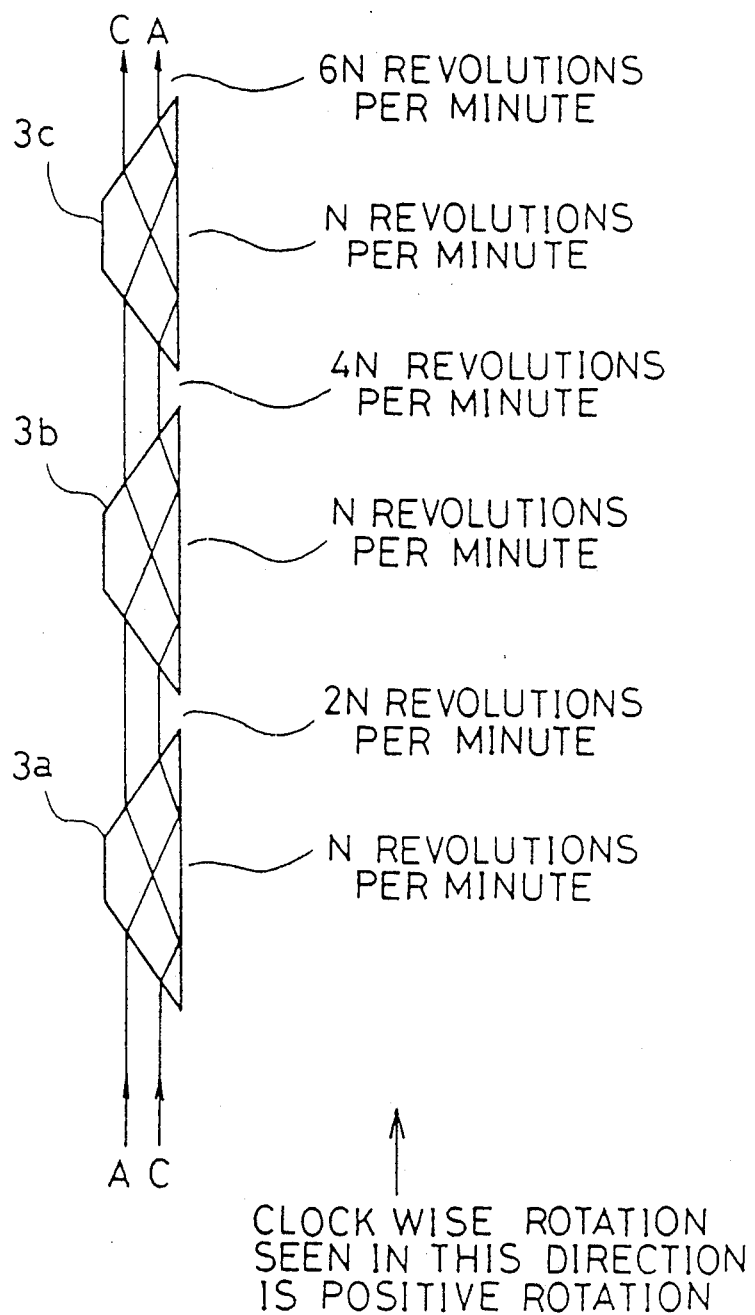
FIG. 5 is a diagram illustrating an embodiment in which three trapezoidal prisms are used.

FIG. 5 illustrates another embodiment of the present invention.

In this embodiment, three trapezoidal prisms are arranged in an optical path incident on the rotary reflecting element, and these prisms are rotated in opposite directions to one another.

These prisms are designated as first, second and third trapezoidal prisms 3a, 3b and 3c from the incident side, and for facilitating the understanding the revolution speeds of these prisms are supposed to be N revolutions per minute, −N revolutions per minute and N revolutions per minute, respectively. The clockwise direction with respect to the advance direction of the beam is regarded as the positive direction in the following description.

As is apparent from the foregoing description, the beam going out from the first trapezoidal prism 3a is incident on the second trapezoidal prism 3b while rotating at a speed of 2N revolutions per minute.

The beams going out from the second trapezoidal prism 3b, which rotates at a speed of −N revolutions per minute, are mirror-surface-symmetric with the face corresponding to the face H described above with reference to FIG. 3. Accordingly, the revolution number L per minute of the beams going out from this second trapezoidal prism 3b is represented as follows:

L = revolution speed of prism 3b + (revolution speed of prism 3b − revolution speed of incident beams), that is, $$L = -N + (-N - 2N) = -4N.$$

Similarly, the revolution number M per minute of the beams going out from the third trapezoidal 3c is represented as follows:

$$M = N + (N - L) = N + 5N = 6N.$$

In this case, the revolution speed of the rotary reflecting element is set at 6N revolutions.

As is seen from the foregoing description, if a plurality of trapezoidal prisms are used and every adjacent prisms are rotated in directions opposite to each other, the objects of the present invention can be attained at a trapezoidal prism-rotating speed sufficiently lower than the revolution speed of the rotary reflecting element, and conditions required for a motor or revolution-transmitting means can be moderated. Incidentally, if adjacent trapezoidal prisms are rotated in the same direction, this results in reduction of the revolution speed of the outgoing beams, and it becomes necessary to increase the revolution speed of the trapezoidal prisms.

The revolution speeds of the respective trapezoidal prisms need not be adjusted to the same level as in the present embodiment, but it is sufficient if the revolution speeds of the trapezoidal prisms are set so that the revolution speed of the beams going bout from the last trapezoidal prism is coincident with the revolution speed of the rotary reflecting element.

Methods of holding and rotating trapezoidal prisms will now be described with reference to the following embodiments.

Figure 6:
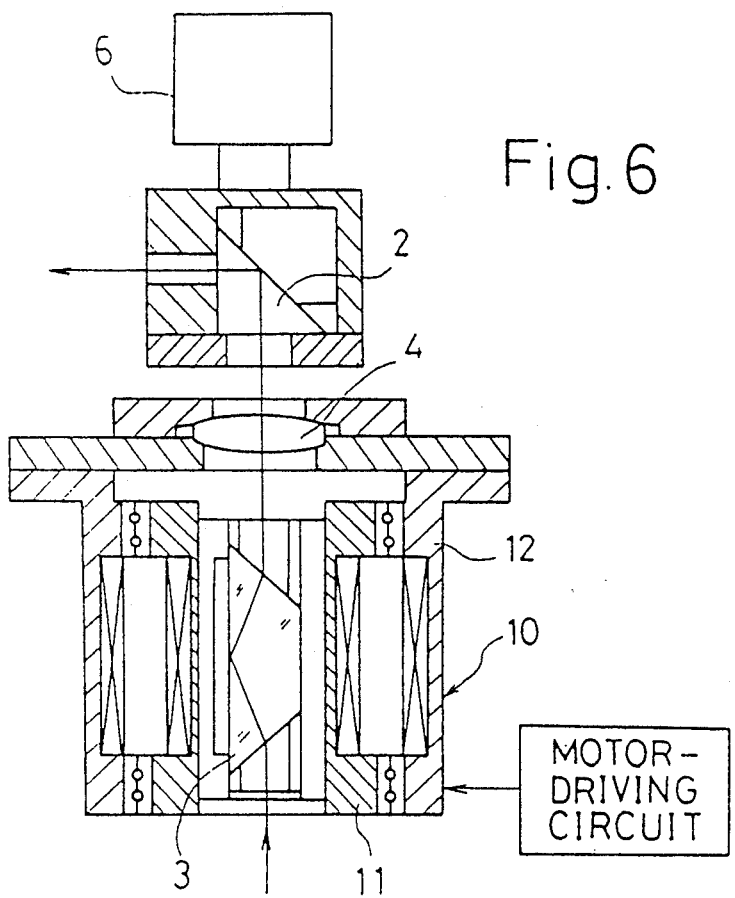
FIG. 6 is a diagram illustrating one means for rotating a trapezoidal prism.

FIG. 6 illustrates an embodiment in which a motor 10 is constructed by a cylindrical member as a rotor 11 and a stator 12 surrounding the rotor 11, and a trapezoidal prism 3 is held in the rotor 11. According to this method, the trapezoidal prism 3 can be directly rotated by the motor 10 without using mechanical revolution-transmitting means such as gears and a high revolution speed can be sufficiently attained.

Figure 7:
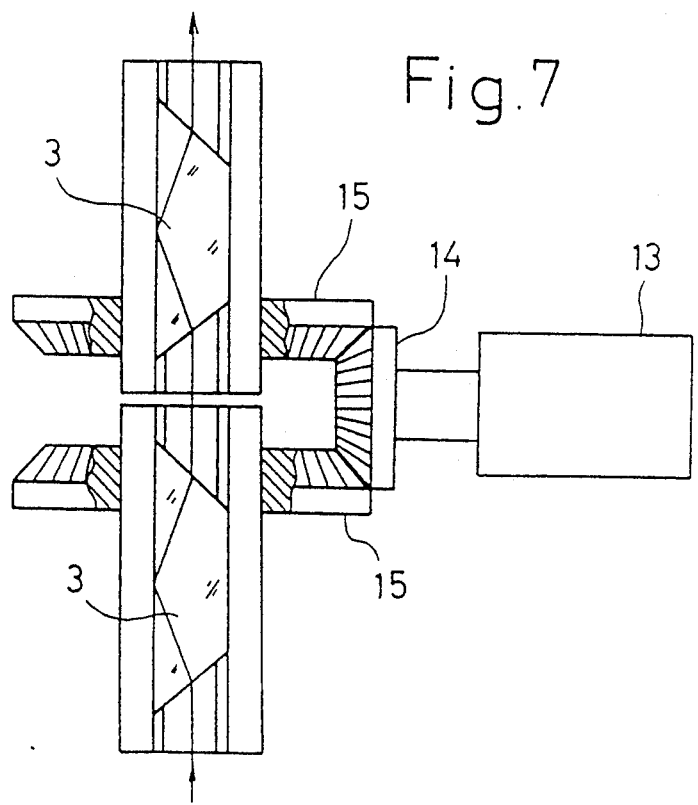
FIG. 7 is a diagram illustrating another means for rotating a trapezoidal prism.

FIG. 7 illustrates an embodiment in which mechanical revolution-transmitting means such as a gear is used for rotating a trapezoidal prism. According to this method, a bevel gear 14 is rotated by a motor 13 and a trapezoidal prism 3 is rotated through a bevel gear 15. In the case where the required revolution speed is low, the intended object can be sufficiently attained by such mechanical revolution-transmitting means.

An acousto-optic modulator, to which a multiple high frequency is to be applied, can be used as the means for obtaining a plurality of beams.

Furthermore, there can be adopted a method in which one end faces of a plurality of optical fibers are aligned and optical beams such as laser beams are made incident on the opposite end faces.

Moreover, beams can be split by optical means such as a beam splitter, or a plurality of independent light sources can be used.

Figure 8:
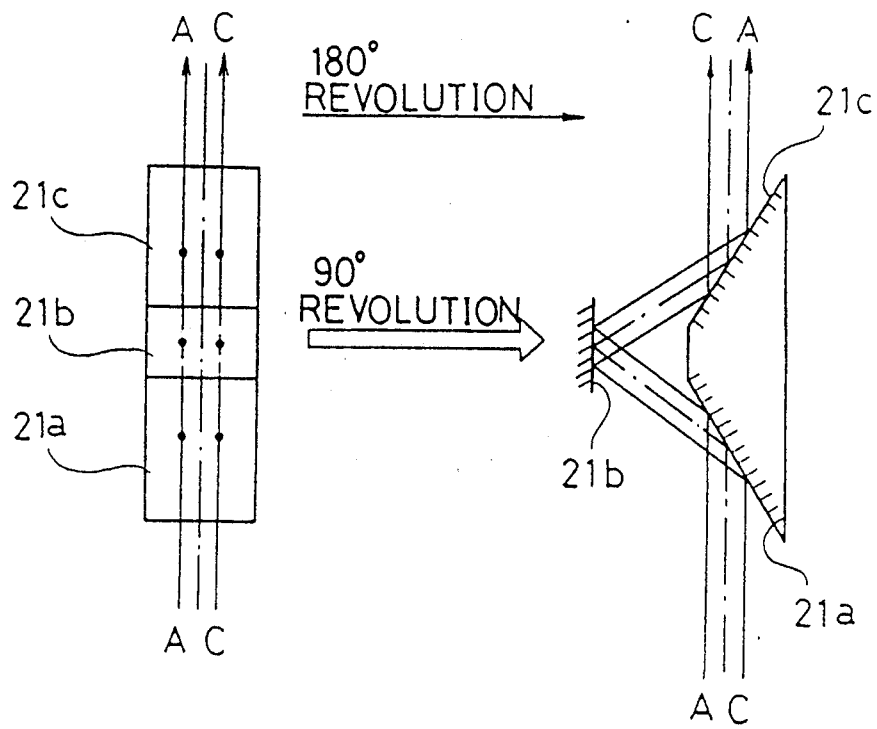
FIG. 8 is a diagram illustrating an embodiment in which a reflecting surface is used.

As the optical structural member of the beam rotating means, instead of the trapezoidal prism, mirrors can be arranged so that three-reflecting surfaces 21a through 21c are produced, as shown in FIG. 8, and equivalent effects can be attained. Incidentally, FIGS. 8, 9, 10, 13 and 14 show the state where each optical structural member is rotated by 90°, in embodiments where the incident beams are rotated by an angle two times the revolution angle of each optical structural member.

A plane mirror is preferably used as the mirror, but the intended objects of the present invention can also be attained even by using a mirror having a curved face. If a mirror having a curved face is used, the functions of the lenses 4 and 5 shown in FIG. 1 can be simultaneously exerted.

This three-mirror structure is different from the trapezoidal prism in the optical path of each beam in the interior of the structural member, but the three-mirror structure is equivalent to the trapezoidal prism in the above-mentioned effect of rotating outgoing beams.

Since a plane mirror is of the non-aberration optical element, if a plane mirror is used as the mirror, an advantage is attained by use of a plane mirror when the degree of divergence of the optical beam is large and a problem of aberration is caused by use of a trapezoidal prism.

On the other hand, since the trapezoidal prism is a single optical element, the trapezoidal prism is advantageous in that a simple holding mechanism can be used.

Figure 9:
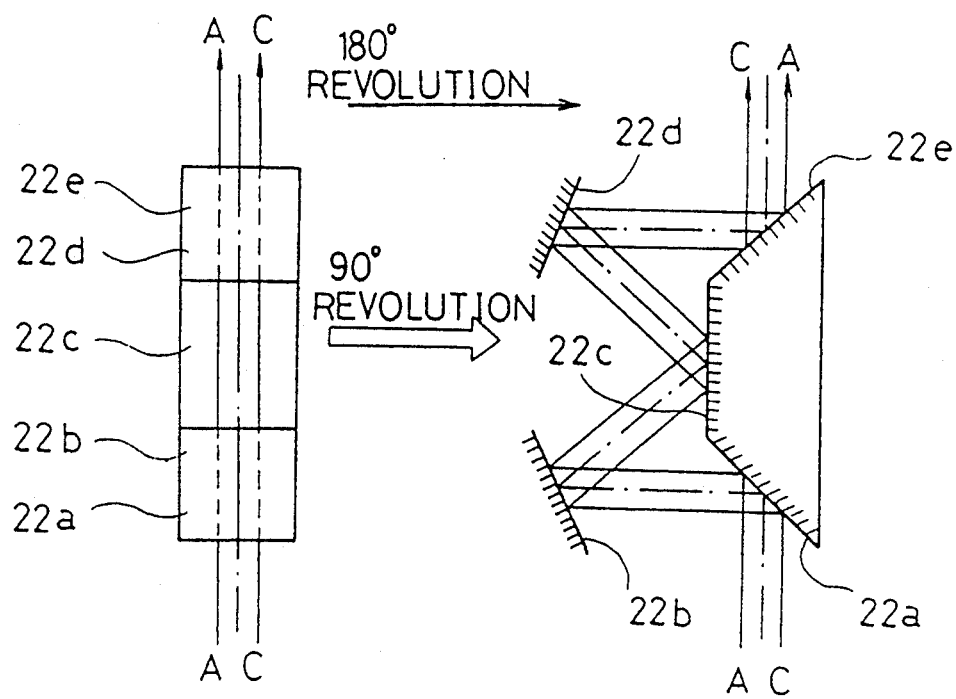
FIG. 9 is a diagram illustrating another embodiment in which a reflecting surface is used.

As is seen from the foregoing description, when reflecting faces are used, the number of the reflecting faces is not limited to three, and by using an odd number of reflecting faces, the objects of the present invention can be attained. FIG. 9 shows an embodiment where five reflecting faces 22a through 22e are used.

Figure 10:
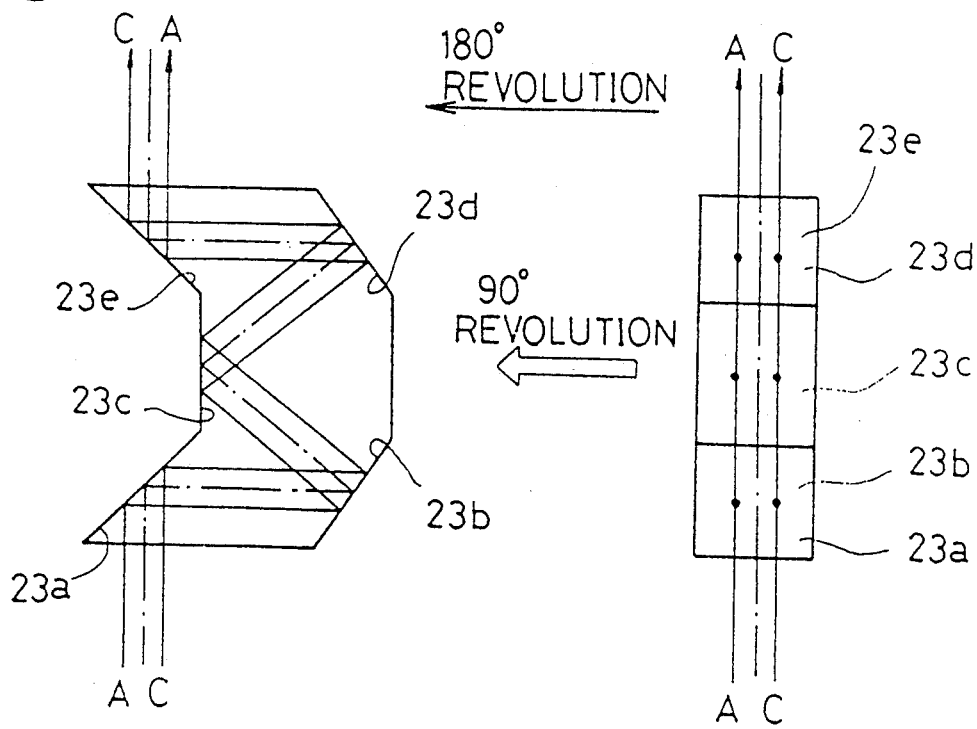
FIG. 10 is a diagram illustrating still another embodiment in which a reflecting surface is used.

A structure utilizing inner face reflection or total inner reflection, such as reflecting faces 23a through 23a shown in FIG. 10, can be used as the means realizing a reflecting surface.

Figure 11:
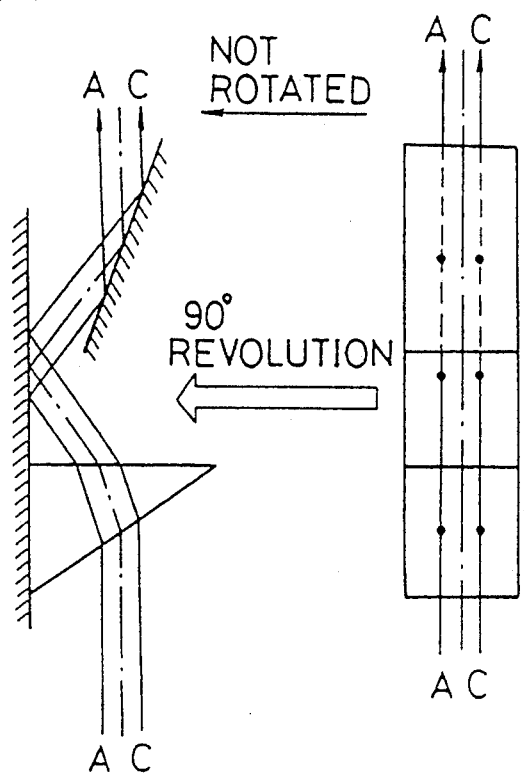
FIG. 11 is a diagram illustrating a referential example showing that when an even number (2) of reflecting surfaces are used, optical beams are not rotated.
Figure 12:
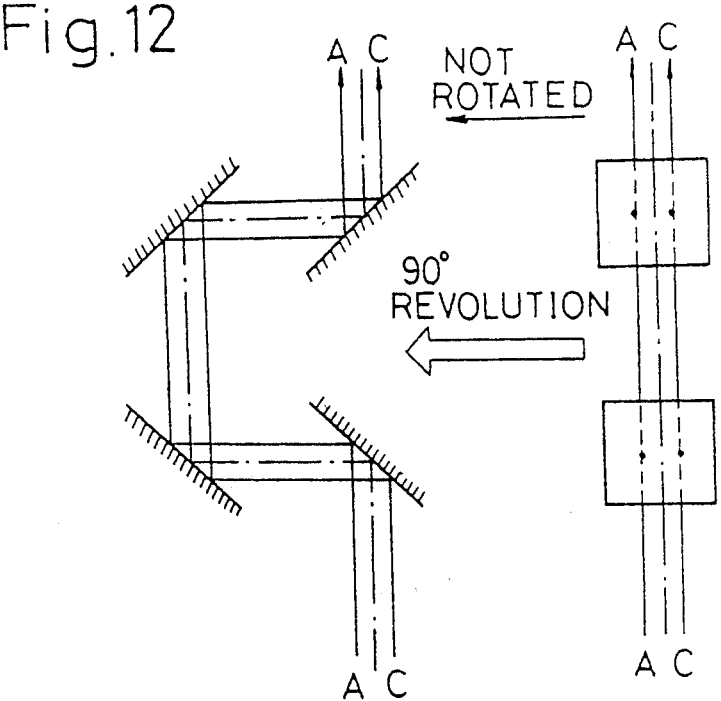
FIG. 12 is a diagram illustrating a referential example showing that when an even number (4) of reflecting surfaces are used, optical beams are not rotated.

FIGS. 11 and 12 are referential diagrams showing the state where each structural member is rotated by 90°, which are given to demonstrate that when an even number, for example, two or four, of reflecting faces are disposed, there cannot be attained any function of rotating optical beams.

Figure 13:
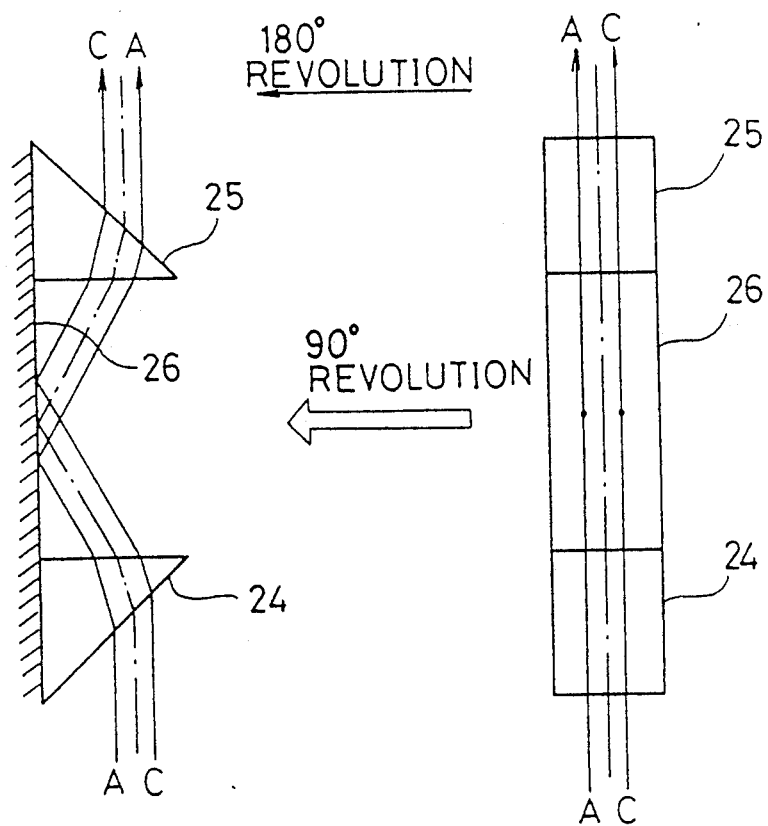
FIG. 13 is a diagram illustrating an embodiment in which a prism and a reflecting surface are used.

A structure shown in FIG. 13 can also be adopted for the optical structural member of the beam rotating means.

FIG. 13 shows an embodiment in which the refraction by a prism is combined with a reflecting face. Prisms 24 and 25 have functions corresponding to those of the faces E and F, a reflecting face 26 has a function corresponding to the function of the face D shown FIG. 1.

Figure 14:
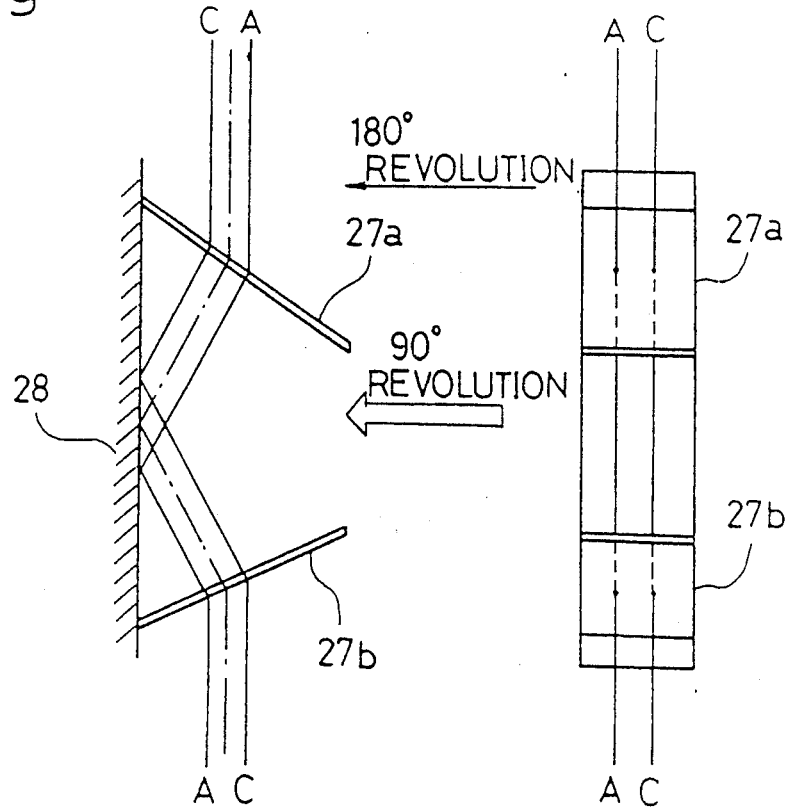
FIG. 14 is a diagram illustrating an embodiment in which a diffraction lattice and a reflecting surface are used.

Similarly, the optical structural member of the present invention can be realized by combining diffraction grating 27a and 27b, which are members diffracting optical beams, with a reflecting surface 28, as shown in FIG. 14.

The requirement for each of the above-mentioned trapezoidal prisms and other optical structural members to exert the function of rotating optical beams is that the optical beams should be reflected an odd number of times in an optical path from the point of incidence to the point of going-out.

According to the present invention, by the above-mentioned structure, a plurality of beams can be scanned on the inner face of the cylinder.

As the means for rotating the rotary reflecting element and trapezoidal prism at a predetermined revolution speed ratio, a plurality of motors can be rotated by known PLL control.

This can also be realized by using a plurality of synchronous motors.

Furthermore, a predetermined revolution speed ratio can be obtained by using a single motor and mechanical means such as a gear, a chain and a belt.

In the case where a plurality of beams are focussed on the inner face of the cylinder according to the above methods to form rows of focussed beams, the beam rows should be rectangular or inclined with a certain angle to the main scanning direction, that is the beam-acting direction.

By this inclination angle, intervals of main scanning lines are determined.

Whether the angle is made variable or stationary is determined according to the intended use of the scanning apparatus of the present invention, but in order to set beam rows at a predetermined angle, the revolution phase relation between the rotary reflecting element and the trapezoidal prism or the like should be maintained at a predetermined value.

This will now be explained with reference to FIGS. 27 and 28.

FIGS. 27 and 28 show that the aligning directions of the beams A, B and C on the inner surface of the cylinder are changed according to the direction of reflection by the rotary reflecting member.

From FIGS. 27 and 28, it is understood that to set the aligning angle of the beams A, B and C on the inner face of the cylinder at a predetermined value means to set the positional relation between the rotary reflecting element and the beams A, B and C incident thereon at a predetermined value, and that for this purpose, it is necessary to set the revolution phase relation between the rotary reflecting element and the trapezoidal prism at a predetermined value.

In the case where the beam rows are inclined to the direction rectangular to the main scanning direction line on the inner surface of the cylinder, recording signals are given at staggered timings according to the discrepancy of the main scanning direction of each beam row, whereby an image is formed.

An example of the method of setting the revolution phase relation between the rotary reflecting element and the trapezoidal prism at a predetermined value will now be described.

Figure 15:
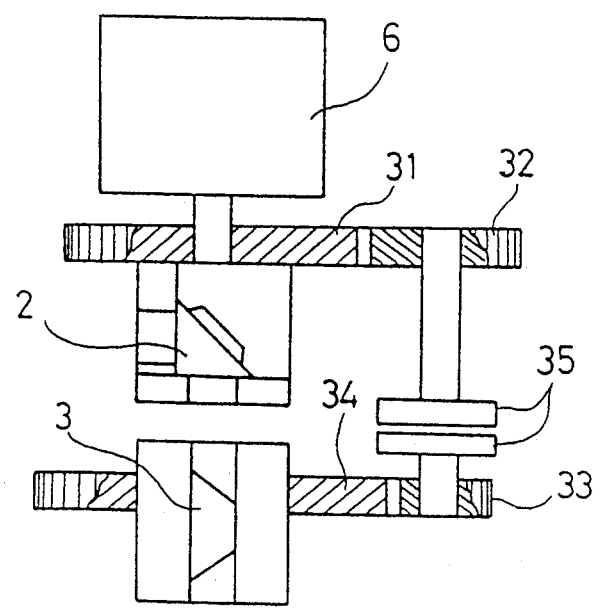
FIG. 15 is a diagram illustrating an embodiment in which a rotary reflecting element and a trapezoidal prism are synchronously rotated by a single motor.

FIG. 15 shows an embodiment in which a rotary reflecting element 2 and a trapezoidal prism 3 are synchronously rotated by a single motor 6 through gears 31, 32, 33 and 34.

If necessary, the revolution phase relation between the rotary reflecting element 2 and trapezoidal prism 3 can be made variable by a clutch mechanism 35.

Figure 16:
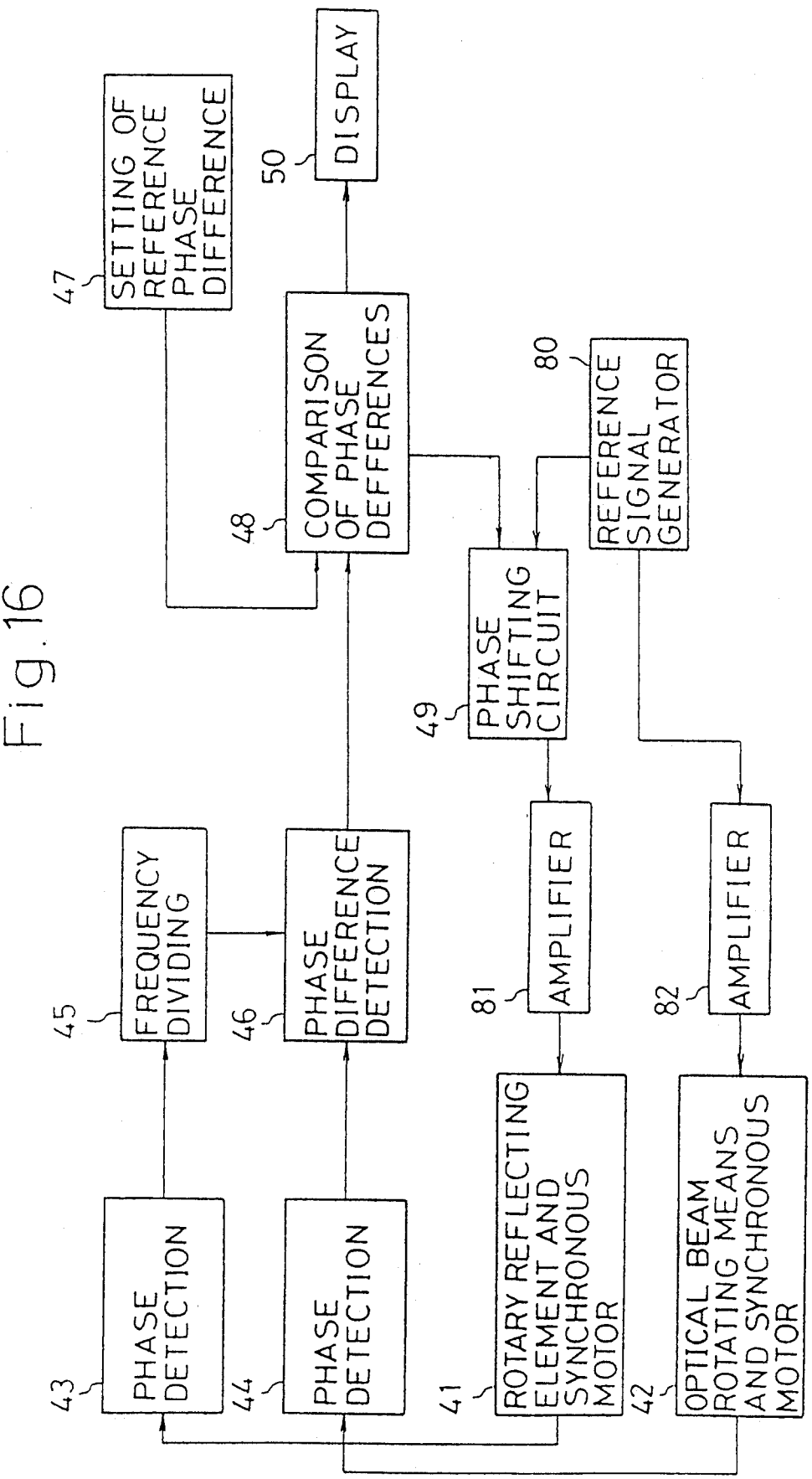
FIG. 16 is a diagram illustrating an embodiment in which a rotary reflecting element and a trapezoidal prism are rotated by different motors, respectively.

FIG. 16 is a functional block diagram showing an embodiment where the element 2 and prism 3 are controlled by different synchronous motors.

In this embodiment, when motors 41 and 42 are started and the revolution speeds arrive at a predetermined level, the phases are detected by phase-detecting circuits 43 and 44 of the respective motors, and if necessary, the rotation signal are passed through a frequency divider 45. Then, the difference of the phases is detected by a phase difference-detecting circuit 46 and is compared with the reference phase difference, set by a reference phase difference-setting circuit 47, by a phase difference comparator 48, and when reference signals are given to both of the synchronous motors 41 and 42 by a reference signal generator 80 through amplifiers 81 and 82, the phase of the reference signal given to one synchronous motor is shifted by a phase-shifting circuit 49 to adjust the phases of the synchronous motors 41 and 42. The phase difference is shown by a display circuit 50, and the set value of the reference phase difference can be changed by a reference phase difference-setting circuit 47.

The above-mentioned means for detecting the revolution phase difference between rotary members of adjusting the phase difference to a variable or fixed predetermined value is well known, and the detection can be realized by a known member such as a slit or pinhole formed on a member rotating integrally with a rotary member, or a hall device. The adjustment can be accomplished by PLL control or the method in which the phase of an alternating current applied to the synchronous motor described above with reference to FIG. 16 is controlled.

With reference to FIG. 2, the direction of alignment of beams focussed on the face of the cylinder can be changed by rotating the direction of alignment of points Pa, Pb and Pc, from which three beams are generated, with the advance direction of beams being as the revolution axis, whereby intervals in the direction rectangular to the main scanning direction on the face of the cylinder is made variable.

In this case, scanning line intervals of main scanning by optical beams can be changed while keeping the revolution phases of the rotary reflecting element and optical beam-rotating means stationary.

Various mechanical and optical methods can be adopted as the means for changing the direction of alignment of Pa, Pb and Pc, and an appropriate method is selected according to the means for obtaining a plurality of beams.

Figure 17:
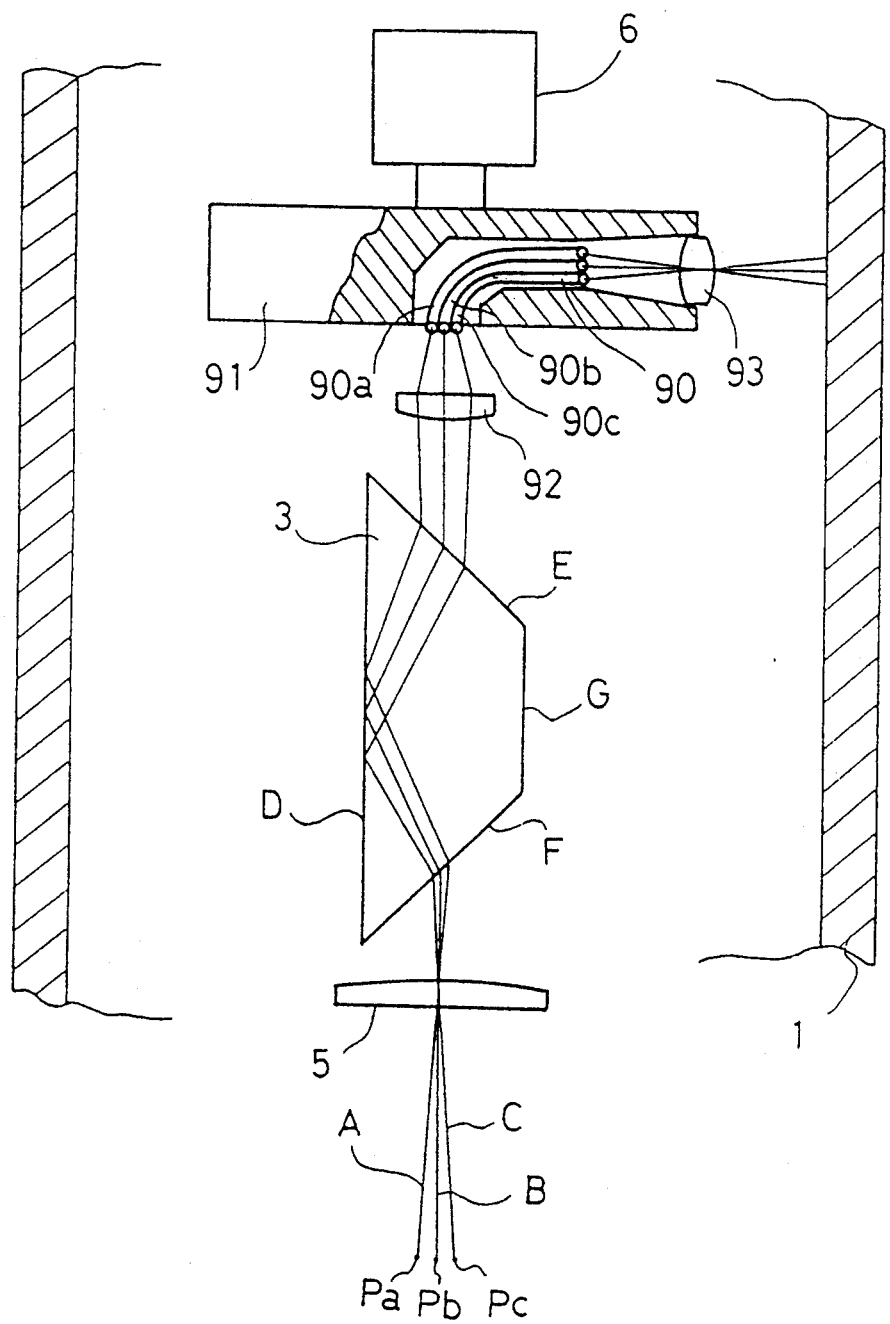
FIG. 17 is a diagram illustrating an embodiment in which an optical fiber bundle is used as the rotary optical means.

Not only light-reflecting means (rotary reflecting element) such as a prism or a mirror but also an optical fiber bundle composed of a plurality of optical fibers, as shown in FIG. 17, can be used as the rotary optical means.

In FIG. 17, the rotary reflecting element 2 shown in FIG. 2 is replaced by an optical fiber bundle 90. The same members as shown in FIG. 2 are represented by the same reference numerals in FIG. 17.

In FIG. 17, the optical fiber bundle 90 is composed of three optical fibers, but obviously, the number of the optical fibers is not limited to three. In FIG. 17, independent optical fibers corresponding to optical beams, A, B and C are represented by reference numerals 90a, 90b and 90c, respectively.

Reference numeral 91 represents a holding member for holding the optical fiber bundle, which is rotated by the motor 6. Reference numeral 92 represents a focussing member such as a lens, which focusses a plurality of beams going out from the optical beam rotating means such as the trapezoidal prism 3 on the incident end face of the optical fiber bundle 90.

FIG. 18 is an enlarged view showing the incident end face of the optical fiber bundle 90. In FIG. 18, a core of the optical fiber 90a, through which light practically passes, is represented by 90a-1, while a clad is represented by 90a-2. Also, in the optical fibers 90b and 90c, cores and clads are similarly represented. On the incident end face of the optical fiber bundle, the end faces of the respective fibers and the respective beams are rotated at the same revolution speed on the same revolution axis, and the same positional relation is always maintained. From the above-mentioned functions of the optical beam rotating means, it is seen that if the optical beam rotating means and the optical fiber bundle are arranged while keeping the axes of them coincident with each other at a high precision, it becomes possible to maintain a constant positional relation between the optical beam and the end face of the optical fiber.

The optical beam and the end face of the optical fiber need not be in a 1:1 correspondence relation, but in order to utilize the energy of the optical beam effectively, it is preferred that each beam be incident on one optical fiber.

The incident end faces of the optical fiber bundle need not be aligned on a straight line or on a circumference, but it is sufficient if the arrangement of the end faces is substantially coincident with the arrangement of the positions of the optical beams A, B and C focused by the optical system comprising the lens 5, the trapezoidal prism 3 and the lens 92.

The optical beams going out from the outgoing end faces of the optical fibers are focussed on the face of the cylinder by focussing means such as a lens 93. Also in this embodiment, the optical beam is expressed as the ray by a geometric line, but practically, each optical beam has a certain divergence determined by the characteristics of the optical fiber and the wavelength of light. The lens 93, like the optical fiber bundle 90, is fixed to the rotary holding member 91. The lens 93 exerts the same function as that of the lens 4 shown in FIG. 2, that is, the function of focussing optical beams on the cylinder, but the position of the lens 93 is limited to the outgoing side of the optical fiber bundle as the rotary optical means.

In the case where an optical fiber bundle is used, the alignment angle of a plurality of optical beams on the face of the cylinder is determined by the direction of alignment of the outgoing end faces of the optical fiber bundle and the focussing means.

The present embodiment is different from the embodiment using the rotary reflecting element in that the direction of alignment of the optical beams on the face of the cylinder cannot be made variable by adjusting the phase relation between the rotary optical means and the optical beam rotating means.

The arrangement of the outgoing end faces of the optical fiber bundle may be such that when an image on the end faces is projected on the face of the cylinder by the lens 93, an arrangement suitable for optical beam recording is attained.

An example of the arrangement is illustrated in FIGS. 19(a) and 19(b).

The end faces should be substantially equidistantly arranged with respect to the direction rectangular to main scanning. with respect to the main scanning direction, the equidistant arrangement is not absolutely necessary, but as in case of the equidistant arrangement shown in FIG. 19(a), the timing difference in image signals given to respective beams can be made constant. In the case where many optical fibers are used, the arrangement shown in FIG. 19(b) can be adopted so as to prevent increase of the visual field of the lens 93.

Obviously, the arrangement angle of the optical beams on the face of the cylinder can be adjusted by adjusting the arrangement angle of outgoing end faces of the optical fiber bundle.

In the case where an optical fiber bundle is used, if the outgoing end faces of fibers and lenses are arranged in the vicinity of the face of the cylinder, it becomes easy to reduce the optical beams diameter on the face of the cylinder. In this case, the inertia moment of the rotary optical means increases and a disadvantage that it is difficult to increase the revolution speed is brought about, but since the optical beam diameter on the face of the cylinder can be reduced, a high image quality can be advantageously obtained.

In the foregoing embodiments, each beam of multiple beam scanning can be of a single color, or beams differing in the wavelength can be used.

In the case where beams differing in the wavelength are used, optical beams differing in the wavelength can be simultaneously used and a single beam or a plurality of beams can be used with respect to each wavelength. Furthermore, there can be adopted a method in which recording is carried out by using a plurality of beams having the same wavelength and then, recording is performed by using a plurality of beams having a different wavelength.

The optical beam scanning apparatus of the present invention where beams differing in the wavelength are used is suitably adopted when recording is effected on a color photosensitive material such as a color film or a color printing sheet by a laser optical source or the like.

In the case where beams differing in the wavelength are used, means utilizing refraction, such as a prism, is not suitably used because the refractive index is influenced by the wavelength, and therefore, it is preferred that the optical beam rotating means be constructed by combining reflecting faces appropriately. However, in the case where the difference of the refractive index poses no practical problem according to the intended use of the optical beam scanning apparatus, also a prism can be used. The same holds good with respect to an element diffracting optical beams, but the difference by the wavelength is larger in the diffraction than in the refraction and the diffraction is relatively unsuitable for optical beams differing in the wavelength.

Figure 20:
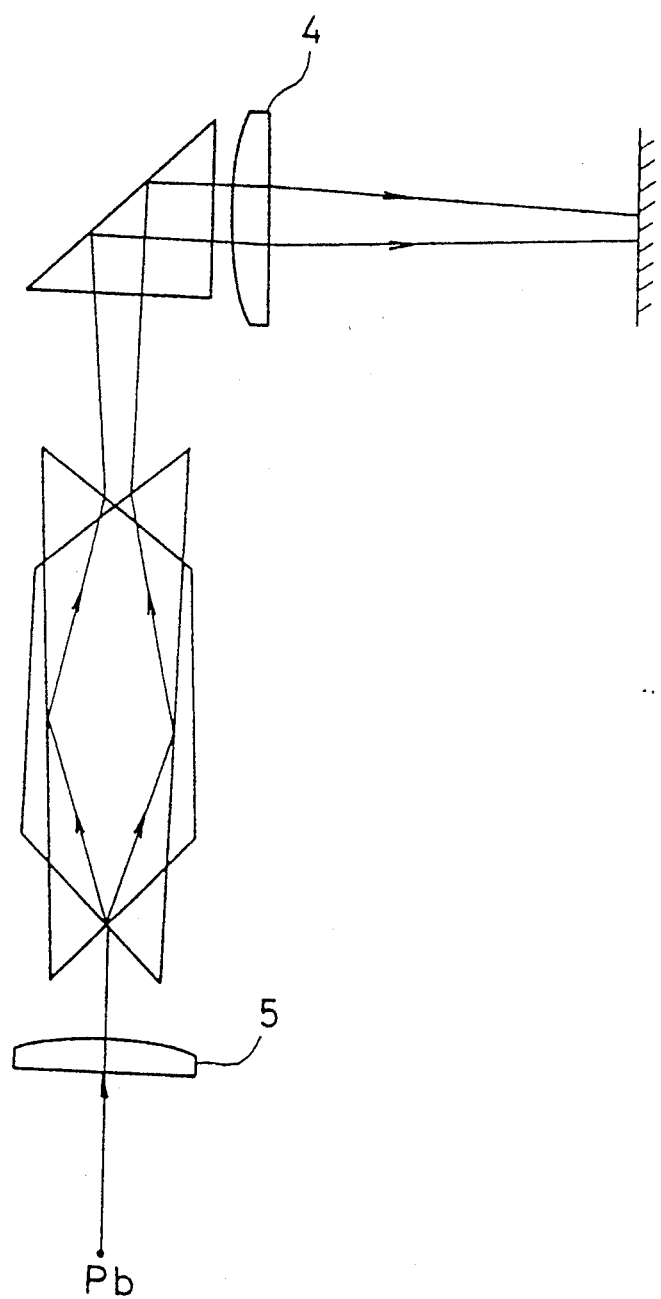
FIG. 20 is a diagram illustrating an example in which the trapezoidal prism is inclined with respect to the revolution axis.

If the attachment precision or processing precision of the optical structural member constructed by a trapezoidal prism is insufficient, dislocation of the beams is caused on the face of the cylinder. This dislocation is illustrated in FIG. 20 with reference to an example where one trapezoidal prism is disposed as the optical structural member. As is apparent from the foregoing description, there are two revolution positions of the trapezoidal prism for one position of the rotary optical means.

FIG. 20 shows the case where the trapezoidal prism is inclined with respect to the revolution axis thereof. If there is such an inclination, the outgoing beams from the trapezoidal prism change the direction thereof according to the revolution position of the trapezoidal prism. Accordingly, because of the presence of two positions of the trapezoidal prism, corresponding to one position of the rotary optical element, the directions of the outgoing beams cannot be parallel to one another. Accordingly, in the arrangement shown in FIG. 1 where beams incident on the lens 4 in parallel are focussed on the face of the cylinder, the beams are not focussed at the same position on the face of the cylinder. Therefore, interval unevenness is caused in scanning lines on the scanning surface and periodical image unevenness appears with two revolutions of the rotary optical means being as one cycle.

It can be understood that a similar phenomenon is caused when the processing precision is insufficient. Furthermore, the above phenomenon is similarly caused when the revolution axis of the trapezoidal prism is not inclined with respect to the revolution axis but the revolution axis per se is inclined with respect to the revolution axis of the rotary optical means.

When an optical fiber bundle is used as shown in FIG. 17, dislocation of the focussing point of beams is caused on the end face of the optical fiber bundle according to the revolution position of the trapezoidal prism or like, with the result that the beams are not efficiently guided into the optical fibers.

Of course, this problem can be solved by increasing the processing precision or attachment precision sufficiently, but this problem can also be solved by adopting another means described below.

This means will now be described with reference to an embodiment where one trapezoidal prism is arranged as shown in FIG. 20. In this case, as pointed out hereinbefore, the trapezoidal prism makes one revolution while the rotary optical means makes two revolutions. In the present embodiment, of two revolutions of the rotary optical means, one revolution is performed while the optical beams are cut off. Namely, scanning of the optical beams is performed at every other revolution. According to this embodiment, of revolution of 360 degrees of the trapezoidal prism, only a specific revolution range of 180 degrees is utilized, and therefore, unevenness of scanning line intervals owing to dislocation of the focussing position, as shown in FIG. 20, is not caused, and the problem described above with respect to the arrangement shown in FIG. 17 is not caused. Even if one revolution of the two revolutions is thus made invalid, as compared with the internal drum scanning system using a single beam, a scanning speed corresponding to ½ of the beam number of multiple beam can be obtained at the same revolution speed.

Also in the case where a plurality of optical structural members are used as shown in FIG. 5 or FIG. 7, only a specific range of the revolution position of the optical structural member may be used as an effective scanning range based on the above-mentioned idea. However, in this case, since the scanning speed is further reduced, the practical effect is relatively low.

Another means for solving the above problem will now be described. In the foregoing illustration, the trapezoidal prism is located at the position between the lenses 4 and 5 where the beams are substantially parallel to one another as shown in FIG. 1. However, from the principle of the optical beam rotating means such as a trapezoidal prism, it is obvious that the function of rotating optical beams can be attained at any optional point between the rotary optical means and the light source, and therefore, this feature is included in the scope of the present invention.

Figure 21:
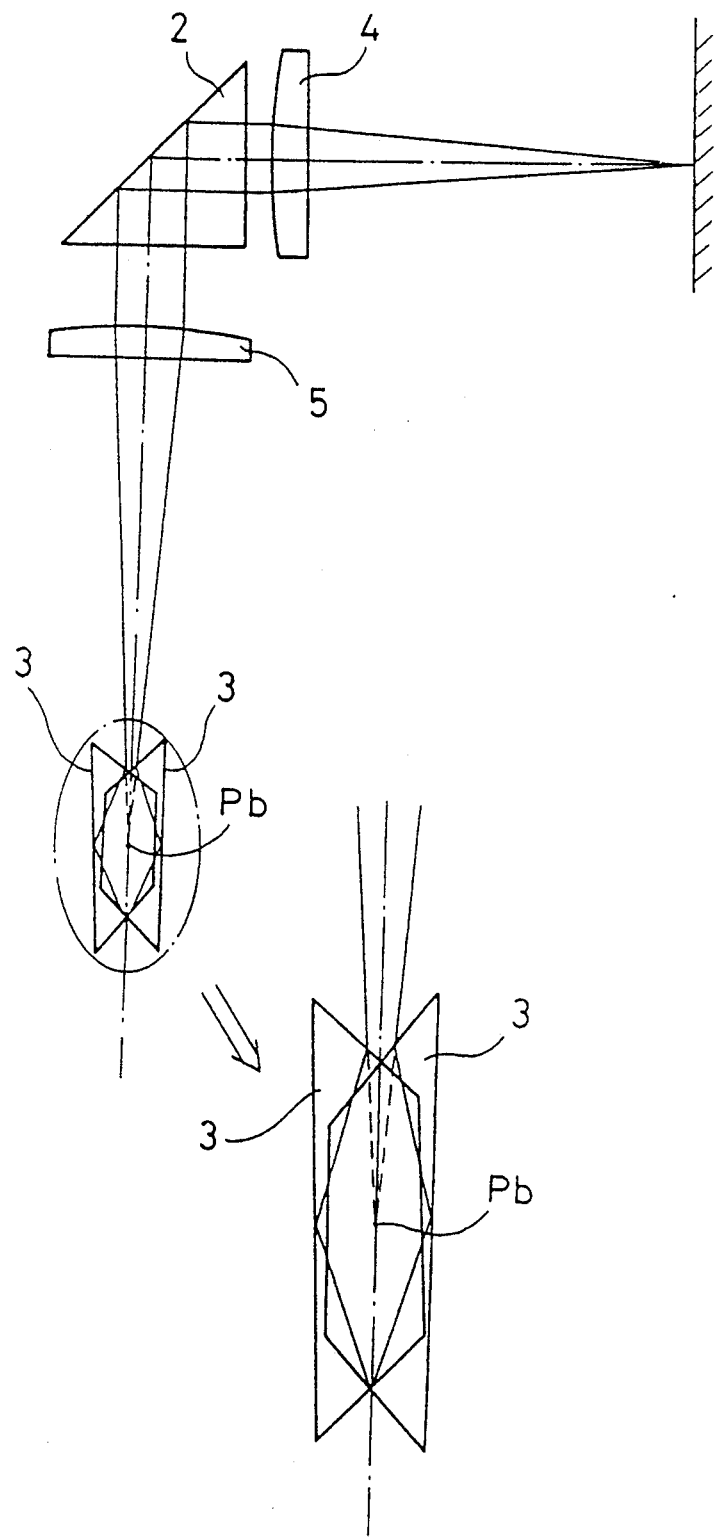
FIG. 21 is a diagram illustrating an example of the arrangement of the trapezoidal prism.

If trapezoidal prisms are located, as shown in FIG. 21, at positions coinciding substantially with points Pa, Pb and Pc shown in FIG. 1, namely positions conjugate substantially with the scanning surface, the problem described above with reference to FIG. 20 can be greatly moderated.

In the case where it is difficult to locate trapezoidal prisms at points Pa, Pb and Pc because end faces of optical fibers are arranged at points Pa, Pb and Pc, real images of the end faces are formed by using appropriate optical image forming means and trapezoidal prisms are placed at the positions of the real images.

In this case, since the position of the trapezoidal prism is close to the beam-focussing position, a trapezoidal prism having a very small size can be used.

In this case, however, it is apprehended that since the beams are not parallelized, an influence of aberration will be brought about. If this influence cause a practical trouble, this apprehension will be removed by using a flat reflecting face as shown in FIGS. 8 and 9 in combination with the trapezoidal prism.

In the present embodiment, another problem resides in that although since the trapezoidal prism or the like is located at a position conjugate with the scanning face, the influence on the position on the scanning face by a variation of the beam direction is not serious, a variation of the beam position results in interval unevenness in the scanning lines on the scanning face. Accordingly, in order to reduce the variation of the position of the beam after going-out from the trapezoidal prism or the like, it is necessary to maintain a high precision in the coaxiality of the trapezoidal prism or the like and the factor having an influence on the variation of the position.

The arrangement position of the trapezoidal prism may be determined based on the above consideration in view of the difficulty or easiness in design and fabrication.

Another advantage of the present invention will now be described.

In the case where an image is recorded by scanning optical beams, the optical beams move at a high speed in the direction of main scanning, but the light exposure time for recording one picture element has a definite length. Accordingly, it is preferred that the shape of beams focussed on the recording face be small in the direction of main scanning and be large in the direction rectangular thereto, because the shape of the recorded picture element is likely to have the same size in the longitudinal and lateral direction. As is apparent from the foregoing description, according to the conventional internal drum scanning system, also the single focussed beam per se is scanned on the face of the cylinder while rotating. This is quite obvious if the beam B is regarded as the center of the single beam in FIGS. 23 and 27 and beams A and C are regarded as peripheral portions of the single beam. Accordingly, in the conventional internal drum scanning system above-mentioned focussed beams shape having a length/width ratio other than 1 can hardly be used.

In this connection, according to the present invention, the focussed beam is not scanned on the surface of the cylinder while rotating, and a certain length/width ratio can be maintained with respect to the direction of the main scanning line.

As is apparent from the foregoing description, according to the optical beam scanning apparatus of the present invention, by giving a predetermined revolution to a plurality of beams incident on the rotary optical means by the optical structural member as the optical beam rotating means, crossing of a plurality of beams going out from the rotary optical means can be prevented, and substantially parallel beam rows can be formed on the face of the cylinder, whereby multiple beam scanning becomes possible and also high-speed recording becomes possible.

Furthermore, from the principle of the present invention, there is attained an effect of making multiple beam scanning possible on the entire periphery of the face of the cylinder, and as is apparent from the foregoing description, even in the case where beams are scanned on a part of the face of the cylinder, there is attained an effect of preventing curving of the scanning lines.

According to the present invention, the above-mentioned effects can be attained, and optical beam scanning can be performed while maintaining a high image quality, a high recording speed and a broad scanning width.

The optical beam scanning apparatus of the present invention is suitable for an apparatus for recording images by scanning laser beams, for which a broad scanning width and a small focused beam diameter are required, such as an output equipment for outputting dots for the production of a printing plate or a laser output equipment for the production of an original plate for printed substrates.

We claim:

1. An apparatus for recording an image on a photosensitive material by scanning with an optical beam having image information of said image comprising:
    a cylinder for mounting said photosensitive material on an internal surface thereof, whereby said photosensitive material faces an interior of said cylinder and is adapted to be scanned in a circumferential direction thereof;
    a projector for said optical beam;
    a first optical device for transmitting said optical beam projected from said projector to said interior in a direction substantially parallel to a central axis of said cylinder;
    a first rotator for rotating said first optical device, wherein said first optical device rotates said optical beam about a rotating axis of said first optical device at a rotating speed twice that of said first optical device;
    a second optical device for changing a direction of said optical beam rotated by said first optical device to a direction which is substantially perpendicular to said central axis so as to direct said optical beam onto said photosensitive material;
    a second rotator for rotating said second optical device about said central axis synchronized with rotation of said optical beam rotated by said first optical device whereby said image is recorded on said photosensitive material by scanning with said optical beam transmitted from said second optical device; and
    a control for controlling said projector so that said optical beam corresponding to only half a rotation of said first optical device is recorded.

2. The apparatus of claim 1 wherein said second optical device comprises a rotary reflecting element which reflects said optical beam at a predetermined angle.

3. The apparatus of claim 1 wherein said second optical device comprises a member rotating about said rotating axis and a bundle of optical fibers held on said member, wherein one end face of said fiber bundle is adjacent said rotating axis and substantially perpendicular to said rotating axis, and the other end face is substantially parallel to said rotating axis.

4. The apparatus of claim 3 further comprising an alignment control adapted to make the alignment angle of said end faces of the respective fibers on an incident side of said optical fiber bundle variable, whereby intervals between said optical beams perpendicular to said curcumferential direction are made variable.

5. The apparatus of claim 1 wherein said first optical device comprises at least one optical member constructed so that said member rotates about a line substantially coinciding with said rotating axis, wherein optical beams exiting said member are substantially parallel to optical beams incident thereto and that, in an optical path between an incident point and an outgoing point, said optical beams undergo reflection an odd number of times.

6. The apparatus of claim 5 wherein said optical member comprises a refraction surface refracting said optical beams and an odd number of reflecting surfaces.

7. The apparatus of claim 6 wherein said optical member comprises at least three reflecting surfaces.

8. The apparatus of claim 5 wherein said optical member comprises an element which refracts said optical beams and a reflector which reflects said optical beams.

9. The apparatus of claim 5 wherein said optical member is a trapezoidal prism.

10. The apparatus of claim 1 further comprising a control adapted to change the relation between said first rotator and said second rotator whereby intervals between a plurality of said optical beams perpendicular to said circumferential direction are made variable.

11. The apparatus of claim 1 further comprising an adjustment device adapted to change angles of rows of a plurality of optical beam sources whereby intervals between said optical beams perpendicular to said circumferential direction are made variable.

12. The apparatus of claim 1 wherein there are a plurality of said optical beams differing in wavelengths.

13. An apparatus for recording an image on a photosensitive material by scanning with an optical beam having image information of said image comprising:
 a cylinder for mounting said photosensitive material on an internal surface thereof, whereby said photosensitive material faces an interior of said cylinder and is adapted to be scanned in a circumferential direction thereof;
 a projector for said optical beam;
 a first optical device for transmitting said optical beam projected from said projector to said interior substantially parallel to a central axis of said cylinder;
 a first rotator for rotating said first optical device, wherein said first optical device rotates said optical beam about a rotating axis of said first optical device at a rotating speed twice that of said first optical device;
 an image formation element for focusing said optical beam rotated by said first optical device on said surface, wherein said first optical device is in a position conjugate with said surface;
 a second optical device for changing a direction of said optical beam rotated by said first optical device to a direction which is substantially perpendicular to said central axis so as to direct said optical beam onto said photosensitive material; and
 a second rotator for rotating said second optical device about said central axis synchronized with rotation of said optical beam rotated by said first optical device whereby said image is recorded on said photosensitive material by scanning with said optical beam transmitted from said second optical device.

14. The apparatus of claim 13 wherein said second optical device comprises a rotary reflecting element which reflects said optical beam at a predetermined angle.

15. The apparatus of claim 13 wherein said second optical device comprises a member rotating about said rotating axis and a bundle of optical fibers held on said member, wherein one end face of said fiber bundle is adjacent said rotating axis substantially perpendicular to said rotating axis and the other end face is substantially parallel to said rotating axis.

16. The apparatus of claim 15 further comprising an alignment control adapted to make the alignment angle of said end faces of the respective fibers on an incident side of said optical fiber bundle variable, whereby intervals between said optical beams perpendicular to said curcumferential direction are made variable.

17. The apparatus of claim 13 wherein said first optical device comprises at least one optical member constructed so that said member rotates about a line substantially coinciding with said rotating axis, wherein optical beams exiting said member are substantially parallel to optical beams incident thereto and that, in an optical path between an incident point and an outgoing point, said optical beams undergo reflection an odd number of times.

18. The apparatus of claim 17 wherein said optical member comprises a refraction surface refracting said optical beams and an odd number of reflecting surfaces.

19. The apparatus of claim 18 wherein said optical member comprises at least three reflecting surfaces.

20. The apparatus of claim 18 wherein said optical member is a trapezoidal prism.

21. The apparatus of claim 17 wherein said optical member comprises an element which refracts said optical beams and a reflector which reflects said optical beams.

22. The apparatus of claim 13 further comprising a control adapted to change the relation between said first rotator and said second rotator whereby intervals between a plurality of said optical beams perpendicular to said circumferential direction are made variable.

23. The apparatus of claim 13 further comprising an adjustment device adapted to change angles of rows of a plurality of optical beam sources whereby intervals between said optical beams perpendicular to said circumferential direction are made variable.

24. The apparatus of claim 13 wherein there are a plurality of said optical beams differing in wavelengths.

* * * * *